US007530785B1

(12) United States Patent  (10) Patent No.: US 7,530,785 B1
Deering et al.  (45) Date of Patent: May 12, 2009

(54) METHOD AND APPARATUS FOR CONTROLLING PITCH AND FLAP ANGLES OF A WIND TURBINE

(75) Inventors: Kenneth J. Deering, Seattle, WA (US); Keith P. Wohlwend, Issaquah, WA (US)

(73) Assignee: The Wind Turbine Company, Bellevue, WA (US)

( * ) Notice: Subject to any disclaimer, the term of this patent is extended or adjusted under 35 U.S.C. 154(b) by 523 days.

(21) Appl. No.: 11/106,133

(22) Filed: Apr. 13, 2005

(51) Int. Cl. *F03D 7/02* (2006.01)
(52) U.S. Cl. .............................. 416/1; 416/98; 416/102; 416/108; 416/155; 416/156
(58) Field of Classification Search ..................... 416/1, 416/98, 102, 108, 148, 155, 156, 158
See application file for complete search history.

(56) References Cited

U.S. PATENT DOCUMENTS

| 5,584,655 A | 12/1996 | Deering |
| 5,660,527 A | 8/1997 | Deering et al. |
| 6,327,957 B1 | 12/2001 | Carter, Sr. |
| 6,441,507 B1 * | 8/2002 | Deering et al. ................ 290/44 |
| 6,514,043 B1 | 2/2003 | Rasmussen et al. |

OTHER PUBLICATIONS

Kooijman, H.J.T. et al.; Energieonderzoek Centrum Nederland (ECN) Zon & Wind; Publicatie DE: ECN-I-96-011; Abstract of "Smart rotor: feasibility study for a passive pitch regulation of a wind turbine rotor blade"; 1996; www.ecn.nl/library/reports/1996/i96011.html.

* cited by examiner

*Primary Examiner*—Christopher Verdier
(74) *Attorney, Agent, or Firm*—Tejpal S. Hansra; Richard L. Hughes

(57) ABSTRACT

A wind turbine with improved response to wind conditions is provided. Blade flap angle motion is accompanied by a change in pitch angle by an amount defining a pitch/flap coupling ratio. The coupling ratio is non-constant as a function of a flap angle and is preferably a substantially continuous, non-linear function of flap angle. The non-constant coupling ratio can be provided by mechanical systems such as a series of linkages or by configuring electronic or other control systems and/or angle sensors. A link with a movable proximal end advantageously is part of the mechanical system. The system can provide relatively large coupling ratios and relatively large rates of coupling ratio changes especially for near-feather pitches and low flap angles.

41 Claims, 24 Drawing Sheets

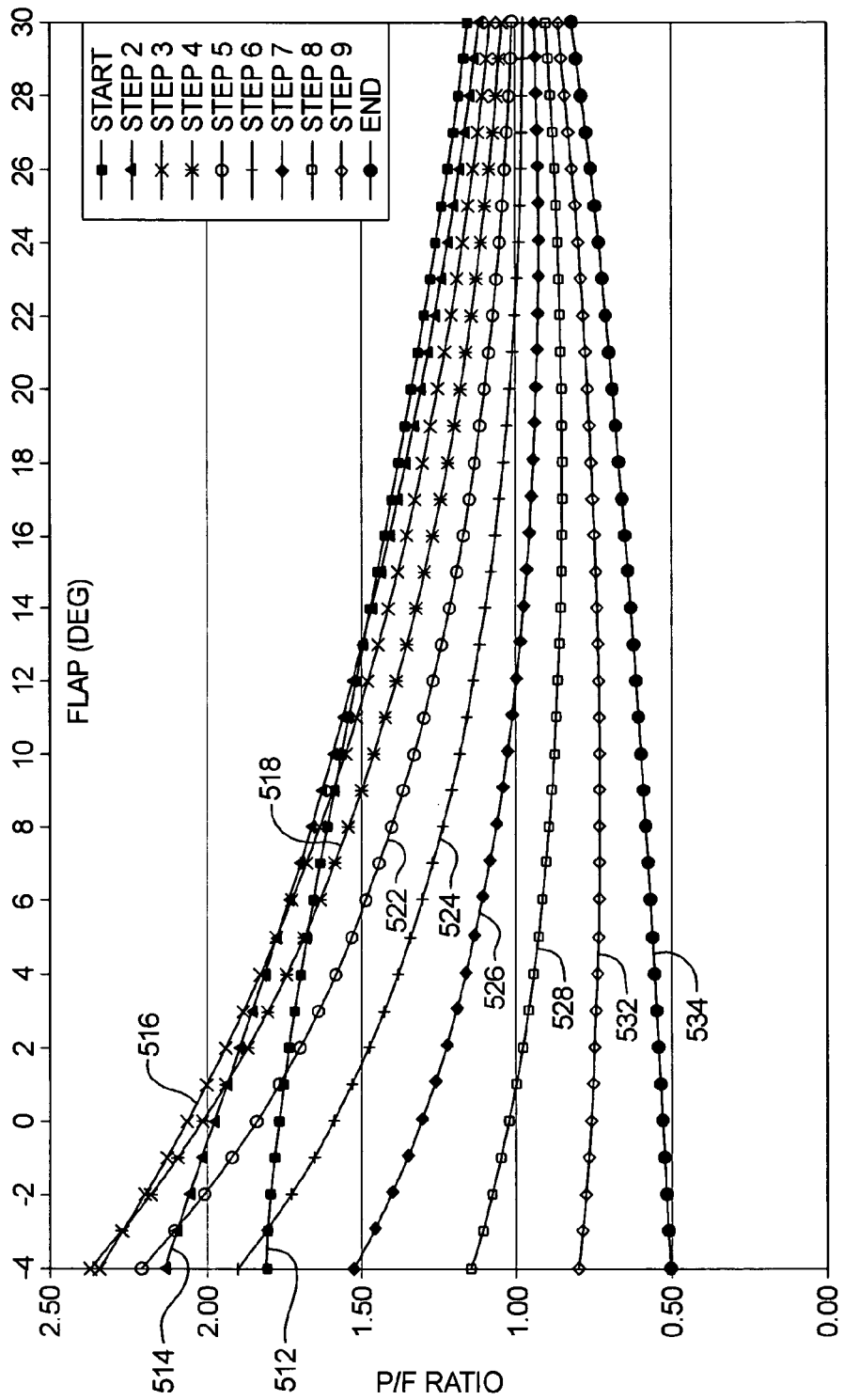

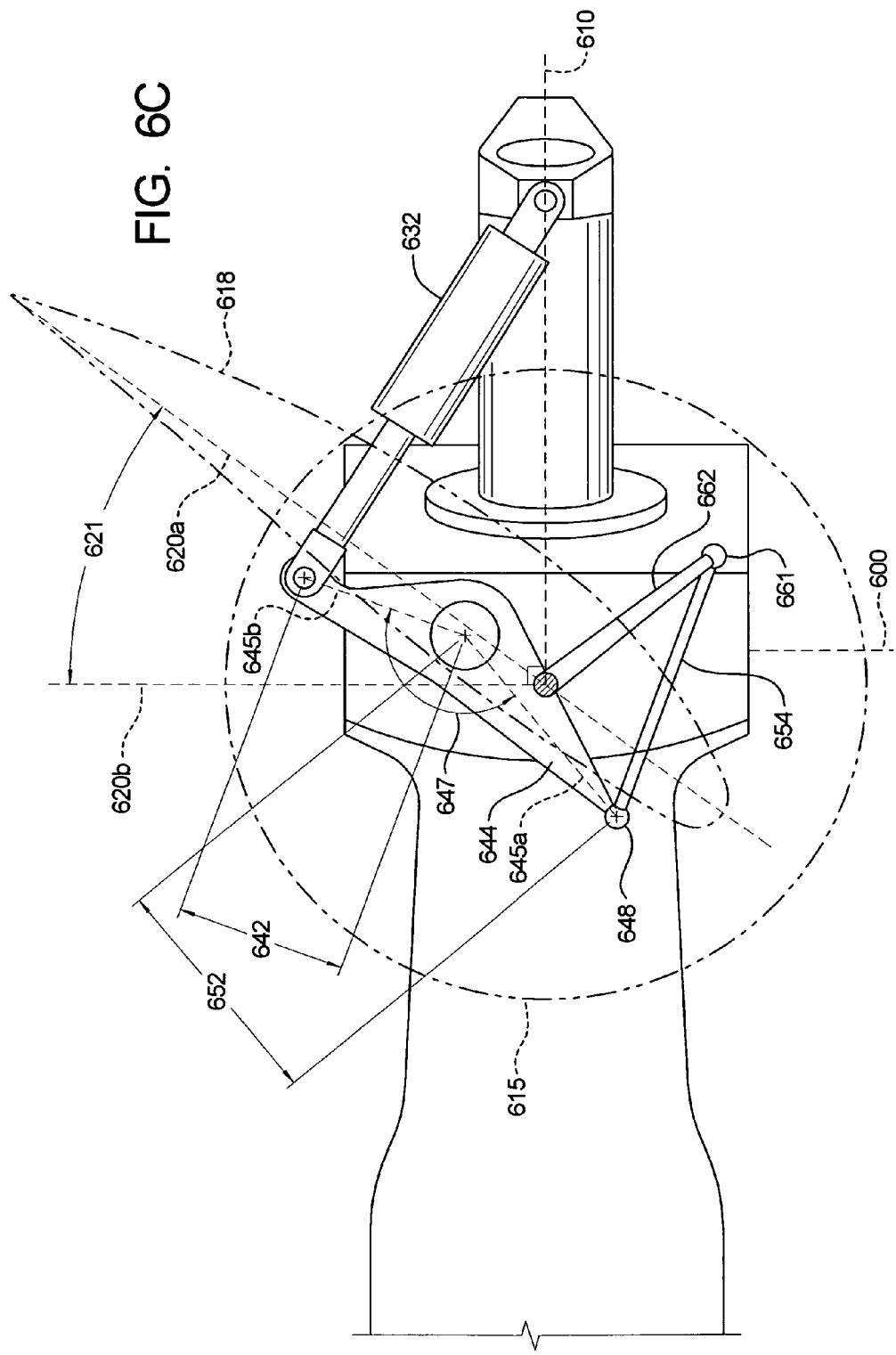

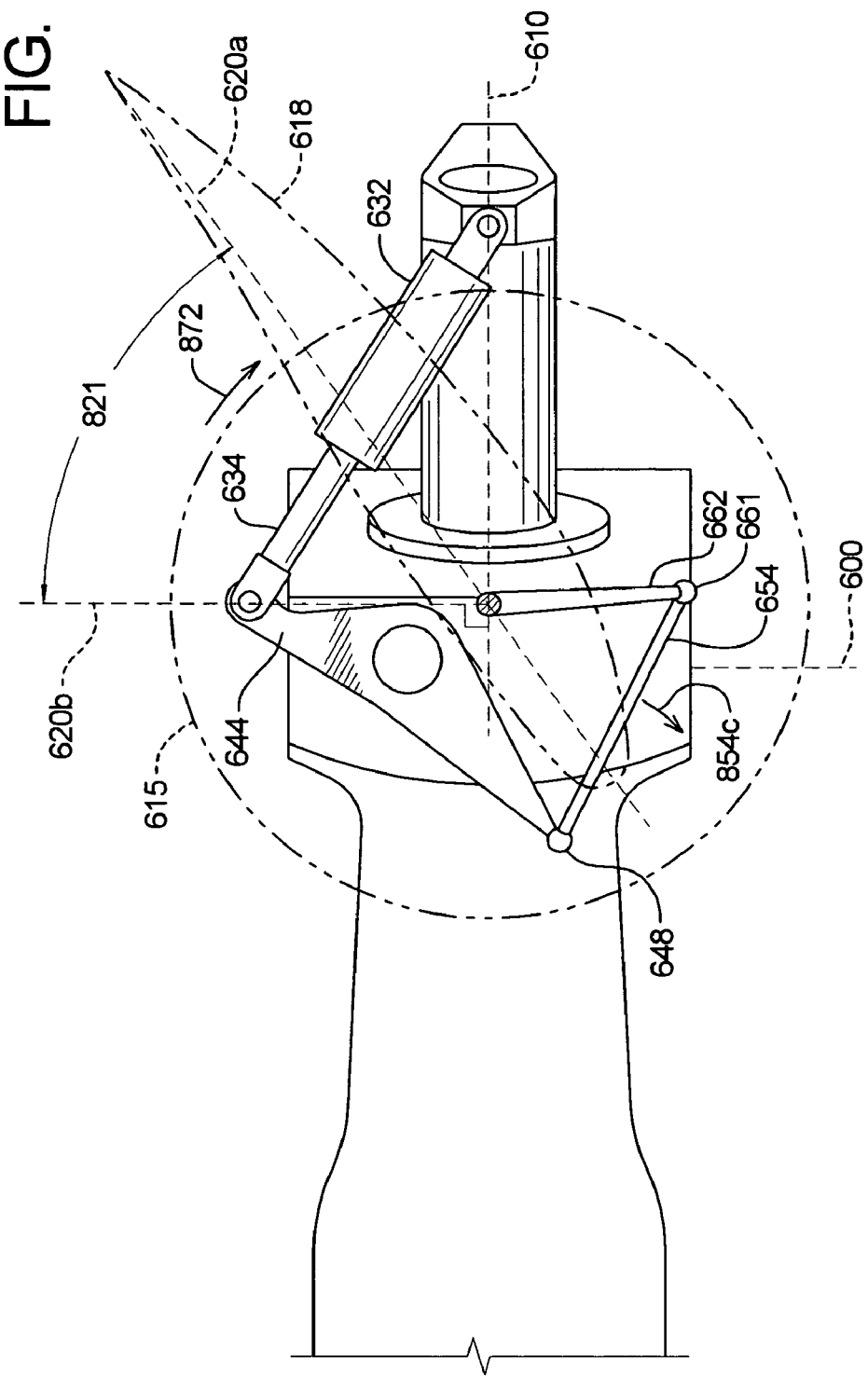

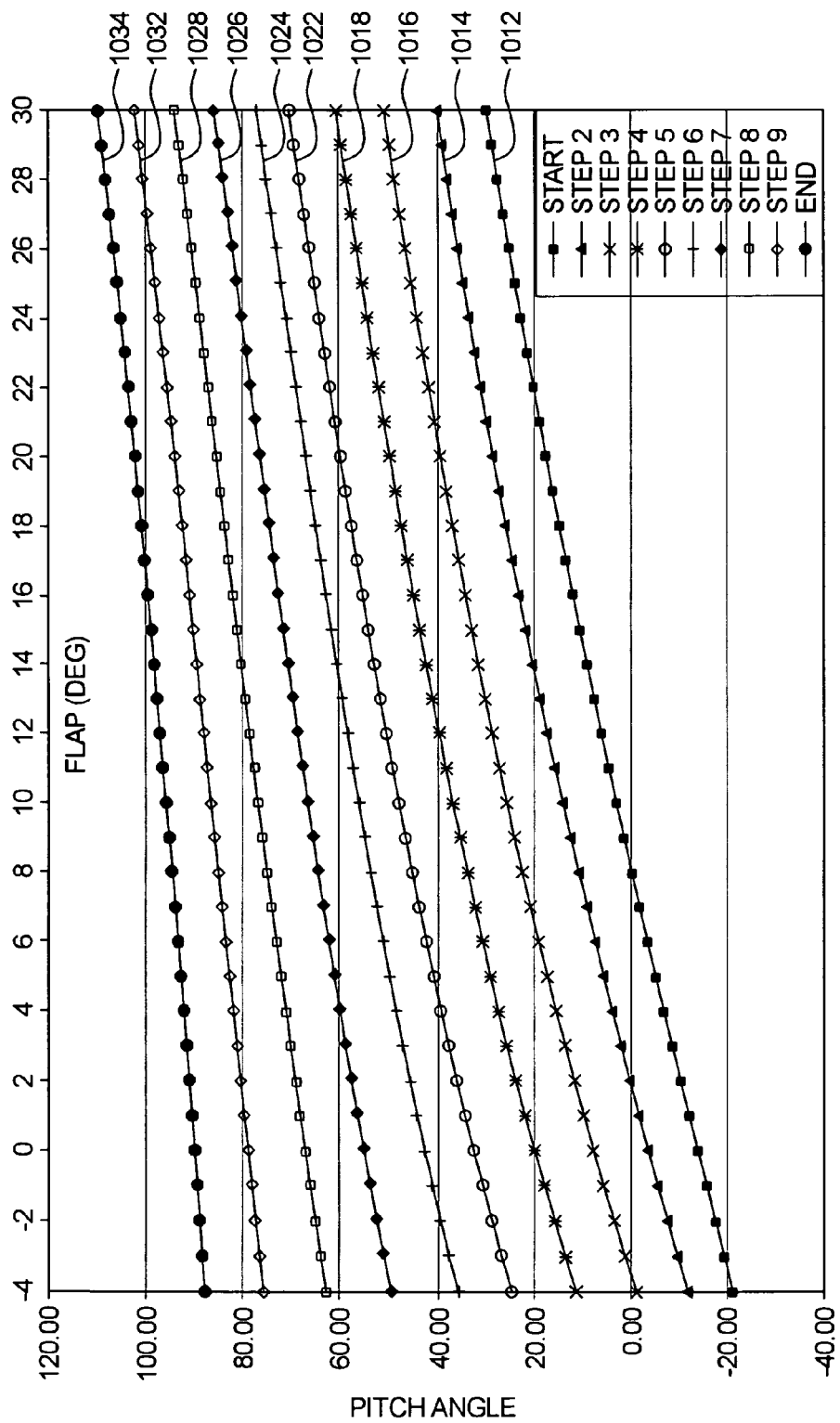

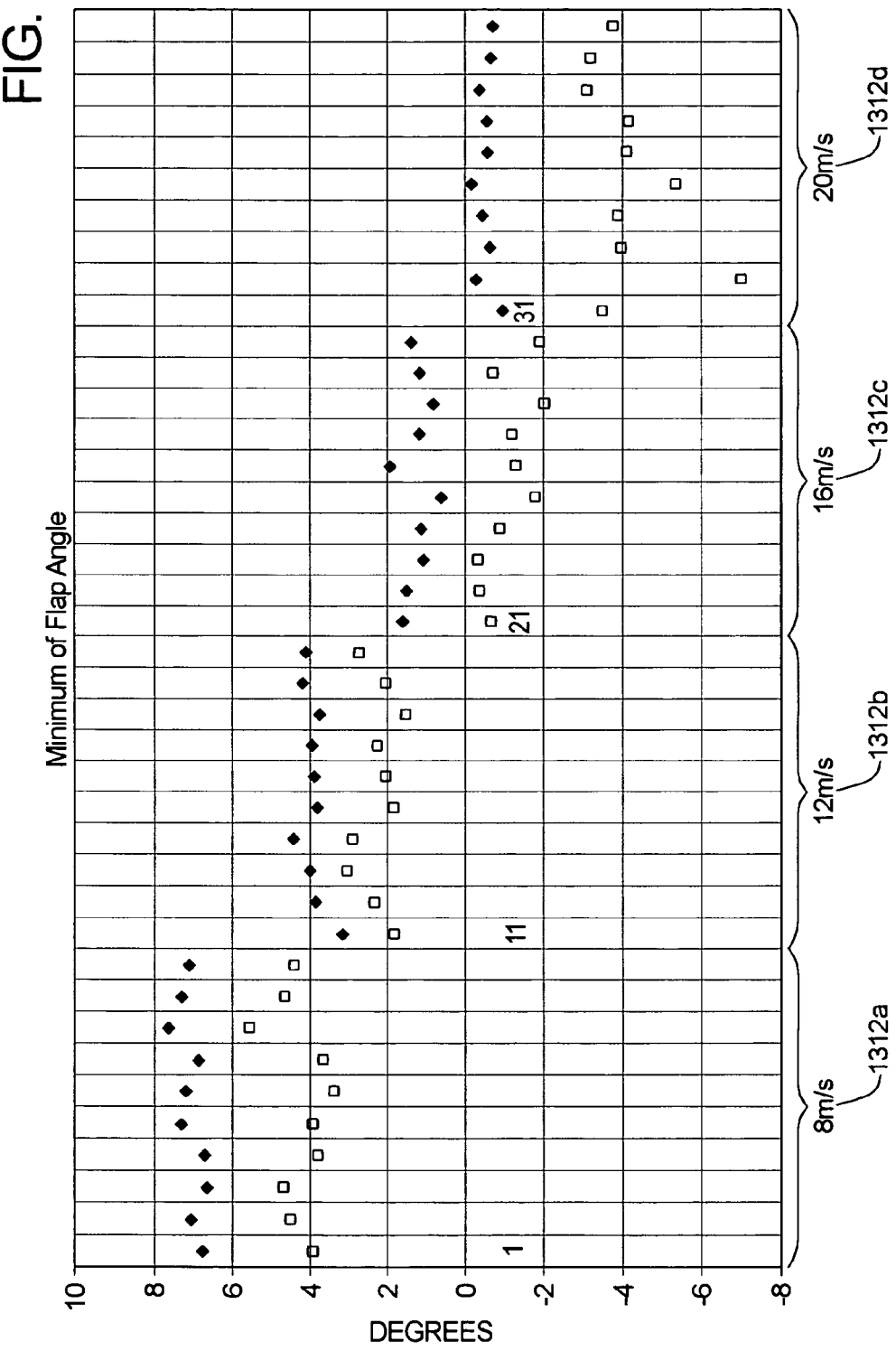

METHOD AND APPARATUS FOR CONTROLLING PITCH AND FLAP ANGLES OF A WIND TURBINE

FIELD OF THE INVENTION

This invention was made with Government support under the National Renewable Energy Laboratory, under Contract Number ZAM-7-13220-29 awarded by the Department of Energy. The Government has certain rights in this invention. The present invention is directed to a wind turbine and particularly to a device and method for controlling pitch and flap angles of the wind turbine.

BACKGROUND INFORMATION

Many attempts have been made to derive useful energy from the wind. In general, design has progressed to the point that, on a per-energy-unit cost basis, wind turbine energy costs approach those of conventional power sources. Because of the size of worldwide power needs, even small incremental changes in wind turbine efficiency can provide substantial benefits.

One factor affecting the operation and economics of wind turbines is variability. The variable nature of wind has, in the past, required devices having sufficient structural strength to withstand the peak loads such as surges in the amount of torque developed (e.g., from wind gusts and the like). Thus, many previous devices required large and strong structures to accommodate, e.g., torque surges, even though, for the majority of the time, such large and strong structures are not needed (i.e. during non-gust conditions). Variability can also contribute to undesirable movement of blades, potentially in a direction towards the tower or other structures, which, if not properly accounted for, can result in a tower strike or other possibly damaging event(s). Furthermore, torque surges result in undesirable power surges. Accordingly, it would be useful to provide a wind turbine which can effectively control torque surges and, thus, reduce the occurrence of power spikes and reduce the need for heavy and strong structures.

Some previous wind turbine designs provided for "teetering" of the blade structure (i.e., pivoting of the blades, as a unit, such that all blades pivot together) with respect to the axis of rotation, e.g., to accommodate non-uniform wind inflow conditions such as wind shear. However, some approaches for limiting the amount of teeter motion tend to provide an undesirable amount of stress on parts, sometimes leading to fatigue and/or failure of components. Further, a teetering wind turbine can have instability in low velocity wind conditions or during a high wind velocity restart.

Some wind turbine configurations permit blades to move with a "flap" motion about a flap axis which is substantially perpendicular to the rotation axis (i.e., through a range of flap angles). As used herein, "flap angle" of a blade refers to the angle measurement between the longitudinal (or pitch) axis of a blade and a plane perpendicular to the rotor shaft axis (the rotational axis) and containing the flap hinge axis associated with the particular blade. U.S. Pat. No. 5,584,655 (incorporated herein in its entirety) includes a description of providing hydraulic cylinders and the like, controllable to permit or drive flap motion e.g., in such a way as to help to reduce cyclic flapping motion of the blades. In general, blades should be actively pitched in the direction of feather (i.e., to reduce aero-dynamic lift) in high wind conditions. U.S. Pat. No. 5,584,655 further describes pitch motion being provided in response to flap motion of the blade 104b. Although a number of factors are described as affecting the coupling ratio between flap motion and pitch motion, U.S. Pat. No. 5,584,655 discloses a system in which the ratio is determined by the design. The pitch flap coupling ratio varies as a function of both pitch actuator position and flap angle. For turbine operation in the critical region around cut-out wind speed, i.e., the maximum operating wind speed for power production, the invention described in U.S. Pat. No. 5,584,655 results in relatively modest variations of pitch-flap coupling ratio over the normal range of flapping motion. For example, from +4 degrees flap angle to −4 degrees flap angle, the pitch-flap coupling ratio increases from 0.7 to 0.8. The increase in pitch-flap coupling ratio, from 0.7 to 0.8, corresponds to about 14 percent. On a downwind turbine, limiting flap motion amplitude in high wind speed conditions, i.e., near cut-out wind speed, is particularly beneficial because in doing so, clearance conditions between the blade tip and the tower are substantially improved. In steady, cut-out wind speed conditions, the mean flap angle is typically around 4 degrees. A sudden decrease in wind speed will cause a corresponding rapid reduction in flap angle, i.e., the blade flaps (moves) in the direction of the tower. By inducing a pitch change in response to the flap motion, the severity of the flap angle reduction will be diminished, blade deflections will be reduced and tower clearance will be more favorable compared to identical conditions but absent such pitch response to flap motion. Although this approach is believed to be useful, e.g., for mitigating extreme excursions in rotor thrust, rotor torque and blade flap moment, it is believed that further improvements in control of pitch and flap angle are possible, including increasing the coupling ratio and/or the rate of change of the coupling ratio (as a function of flap angle), especially in low flap angle conditions (such as between about +4 degrees and −4 degrees).

SUMMARY OF THE INVENTION

The present invention includes a recognition of the existence, source and/or nature of certain issues or problems in previous approaches, including as described herein.

The present invention includes control of some or all of a number of wind turbine components which can lead to reduction or elimination of torque fluctuation, power spikes, and/or reduction or elimination of component failure or damage, including that otherwise arising from blade flap.

In one embodiment, each blade can be rotated substantially along its longitudinal axis, or is otherwise movable to establish a pitch angle for the blade. In cases where the pitch varies along the length of the blade, (e.g., where the blade experiences some twisting, and/or where the longitudinal axis is non-linear and/or changeable), changes in blade pitch angle can be described with reference to a predefined angular orientation of a relatively stable pitch position of the blade or its support such as the blade root. In one embodiment, each rotor blade is pivotable or is otherwise movable at its root end to provide flap motion, and change of the blade pitch is related to flap motion. In one embodiment, the ratio of angular degrees of change in flap motion to angular degrees of resultant change in pitch motion (the coupling ratio) is variable in the sense that the ratio has at least two different values for two different flap angles. Preferably, the ratio is substantially continuously varied or progressive through a range of flap angles. In at least some circumstances it is believed especially useful to consider the behavior of the system when the blade pitch is set at or near its "cut-out" value, typically, the condition at, or just before, power generation is terminated (e.g., in high wind conditions). Preferably, in at least a first ("near cut-out") range of flap angles, such as between +4 degrees and −4 degrees, a coupling ratio of greater than 0.8, preferably greater than 1.0 and more preferably about 2.0 or more is achieved. Preferably, across such first range of flap angles, the change in the near cut-out coupling ratio is greater than about 15 percent, preferably greater than about 20 percent, and more preferably about 28 percent or more.

Notwithstanding, the usefulness of a high coupling ratio and high rate of change in high and/or variable wind conditions, it can be advantageous to provide a pitch flap coupling system which also has other desired behavior, e.g., in other conditions. For example, it would be advantageous, in a stationary or parked rotor condition to have a low coupling ratio and/or low rate of change of coupling ratio, preferably across substantially the full normal operating range of flap angle and/or crank arm position.

In one embodiment, a wind turbine with improved response to wind conditions is provided. Blade flap angle motion is accompanied by a change in pitch angle by an amount defining a pitch/flap coupling ratio. The coupling ratio is non-constant as a function of a flap angle and is preferably a substantially continuous, non-linear function of flap angle. The non-constant coupling ratio can be provided by mechanical systems such as a series of linkages or by configuring electronic or other control systems and/or angle sensors.

A link with a movable proximal end advantageously is part of the mechanical system. The system can provide relatively large coupling ratios and relatively large rates of coupling ratio changes for near-feather pitches and low flap angles.

BRIEF DESCRIPTION OF THE DRAWINGS

FIG. 5 is a graph illustrating coupling ratio as a function of flap angle for a plurality of crank arm positions, which can be provided according to embodiments of the present invention;

FIG. 6C is a top plan view corresponding to FIG. 6A, looking down along the longitudinal axis of the blade, with the blade root perimeter and blade support disk perimeter shown in phantom and the upper blade support and the lower blade and blade attachment removed;

FIGS. 8A-C correspond to FIGS. 6A-C, respectively, but with a second, larger flap angle;

FIG. 10 is a graph illustrating pitch angle as functions of flap angle a for a plurality of crank arm positions, corresponding the coupling ratios of FIG. 5, which can be provided according to embodiments of the present invention;

FIG. 11 is a graph of minimum flap angles for a variety of modeling runs, shown on the horizontal axis, modeling an embodiment of the present invention;

DETAILED DESCRIPTION OF THE PREFERRED EMBODIMENT

Figure 1:
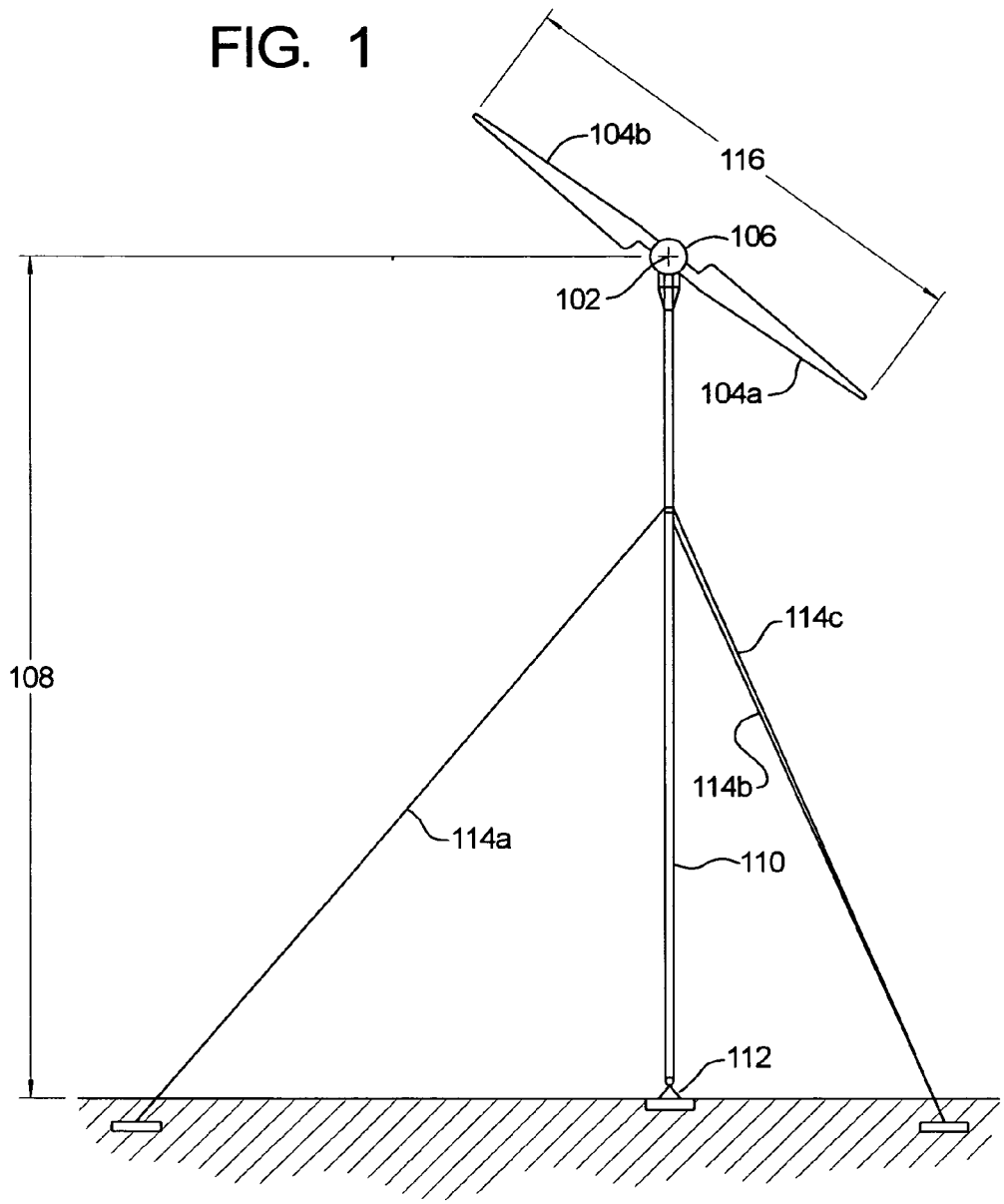
FIG. 1 is a schematic front elevational view of a wind turbine and tower according to an embodiment of the present invention.

The present invention can be applied to many configurations of wind turbines, including a variety of sizes and power ratings. FIG. 1 shows one example of a wind turbine that can be used in connection with the present invention. As depicted in FIG. 1, power is generated by rotation of airfoil-shaped blades 104a, 104b about a rotation axis 102, e.g., by transmission of the rotational motion to an electric generator. A number of blade materials can be used, including glass fiber composites. In the depicted embodiment, the generator 106 and blades 104a, 104b are positioned a distance 108 above the surface of the ground by a tower 110 mounted on a base 112 and positioned, e.g., using guy wires 114a, 114b, 114c. In one embodiment, the rotating blades 104a, 104b define a circle having a diameter 116 of about 54 meters. In one embodiment, the height 108 of the tower is about 100 meters.

Figure 2:
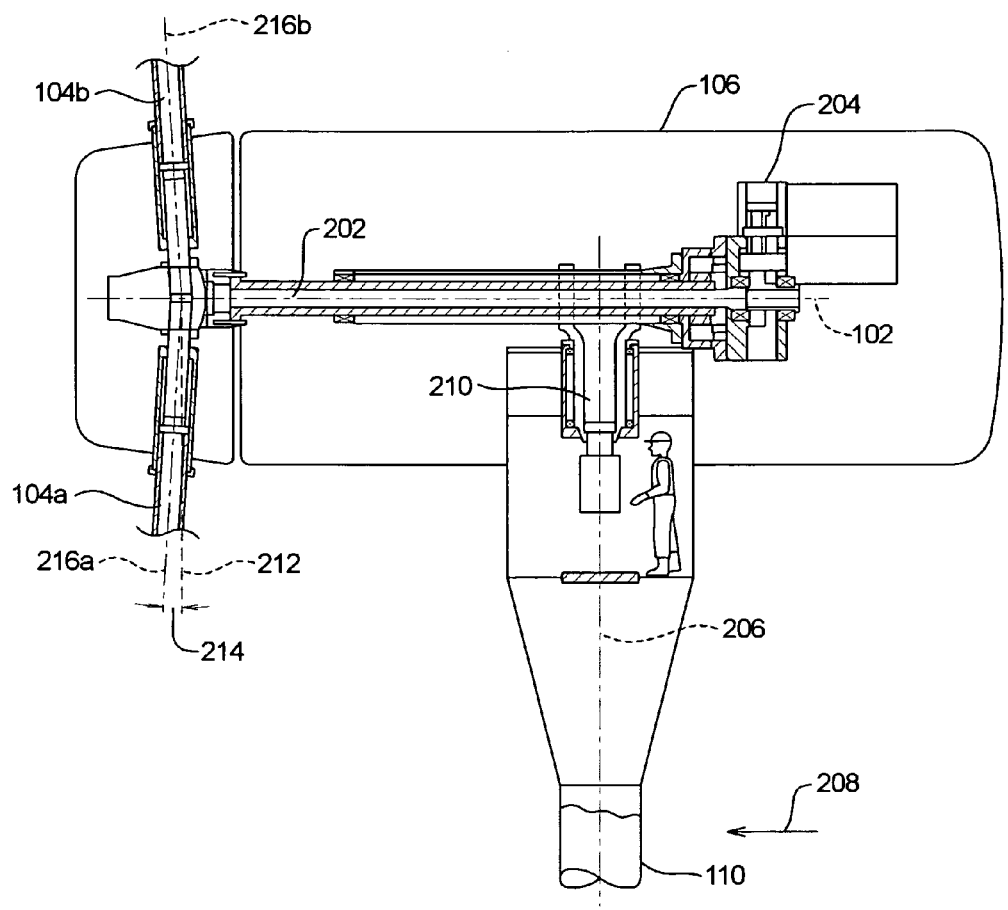
FIG. 2 is a schematic partial cross-sectional view of a blade structure, rotor, and generator for a wind turbine according to an embodiment of the present invention.

As depicted in FIG. 2, rotation of the blades 104a, 104b about the rotational axis 102 is transferred, via shaft 202, to an electric generator 204. The low-speed shaft 202 is typically stepped up to a high-speed shaft, using gears, to drive an electric generator at a high rotational speed. The particular configuration depicted in FIG. 2 relates to a downstream device, i.e., a device in which the housing 106 is moved, e.g., by rotation about vertical axis 206 such that the blades 104a, 104b, at least during normal operating conditions, are downstream from the tower 110 with respect to the wind direction indicated by arrow 208, i.e., such that a given moving air parcel will reach the tower 110 before it reaches a blade 104a, 104b. At least some aspects of the invention can also be used in connection with upstream configurations. In the depicted embodiment, a spindle 210 can be provided for positioning or maintaining the blades 104a, 104b in the desired downstream configuration by rotating the housing 106 about vertical axis 206.

As can be seen from FIG. 2, the longitudinal axes 216a, 216b of each of the respective blades 104a, 104b will sweep out a cone as the blades rotate. The angle 214 defined by this cone, with respect to the plane 212, is referred to as a "cone angle" and will in general have the same value as the flap angle of the blade.

Several approaches are possible for providing a cone angle 214. In one approach, the angle 214 is fixed so that a constant cone angle is provided (sometimes referred to as "pre-coning"). This, however, provides proper results only for a single constant wind speed, and thus has deficiencies in the common situation where wind speed is variable. Another approach is to provide free pivoting of the blades through a range of angles 214, so that the particular angle 214 achieved will, at any time, be substantially a balance between the centrifugal forces on the blade (tending to move the blade towards the plane 212 hence reducing angle 214) and the aerodynamic lift forces on the blades (tending to increase the angle 214). Although this provides a useful feature that the angle 214 can change as a function of, e.g., wind speed and/or blade rotational velocity, the free-pivoting blade structure typically results in undesired cyclic changes in the angle 214 for an individual blade as it rotates through a complete revolution, (which may involve a rotation rate of, e.g., about 30 revolutions per minute (r.p.m.) or more) since, e.g., the effect of gravity on a blade, balanced by other forces, will change as the blade rotates. In at least this way, design considerations for blades with a substantially horizontal axis of rotation are substantially different from design configurations for a system with a substantially vertical axis of rotation. In this regard, it is useful to distinguish between (typically undesirable) "flapping," i.e., cyclic changes in the angle 214 on a short time scale (such as once per revolution) and potentially desirable changes in the angle 214 over a longer time scale (such as once in a period of about a minute or more, potentially remaining constant for hours in steady wind conditions). Also, it is believed that the free-pivoting blade configuration can result in undesirable yaw (i.e., undesired vaning or pivoting about vertical axis 206, away from the desired downstream configuration), because cyclic changes in the cone angle 214 can change the angle of incidence (i.e., the angle at which the blade effectively meets the fluid stream as the blade rotates).

Another approach to providing some amount of cone angle variation is to provide flexible blades which, rather than pivoting, can bend into or towards an angled configuration (at least over a portion of the length of the blade, such as at its root). Although most blade structures will have some amount of flexibility, when this is provided in an uncontrolled fashion, it essentially results in a short time scale balance between centrifugal force and aerodynamic lift, and thus is subject to many of the same problems discussed above, for a freely-pivoting blade.

Figure 3:
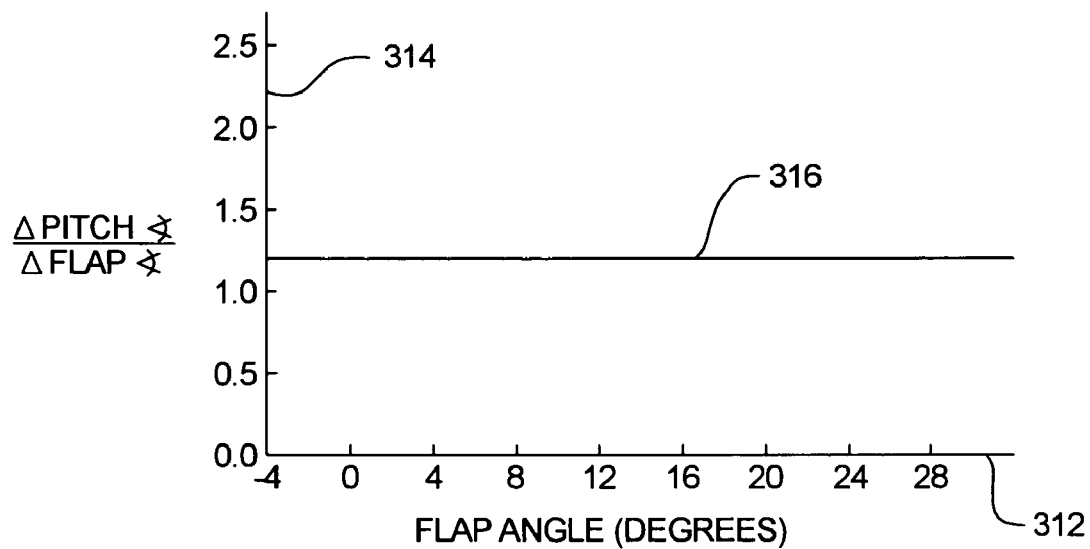
FIG. 3 is a graph illustrating coupling ratio as a function of flap angle, for a constant coupling ratio, according to previous approaches.

FIG. 3 illustrates a situation in which the coupling ratio is constant (in this case, constant as a function of flap angle). In the illustration of FIG. 3, the horizontal axis 312 represents flap angle, in a range from –4 degrees (i.e., inclined, from a plane perpendicular to the rotor axis, in a direction towards the tower, by 4 degrees) to 28 degrees. The vertical axis 314 of FIG. 3 represents the coupling ratio, expressed here as the (dimensionless) ratio of the change in flap angle to the change in pitch angle. As shown in FIG. 3, the ratio maintains a constant value 316 throughout a range of flap angles. In the situation depicted in FIG. 3, the constant ratio is 1.2. Thus, in the situation depicted in FIG. 3 when the flap angle is, e.g., +10 degrees, a change in the flap angle of 1 degree will be accompanied by a change in the pitch angle of 1.2 degrees. Since the coupling ratio is constant as a function of flap angle, if the flap angle is at, e.g., –2 degrees, the same situation is seen, i.e., a change in the flap angle of 1 degree will be accompanied by a change in pitch angle of 1.2 degrees.

For simplicity of expression, coupling ratio ("pitch-flap coupling ratio") may be described herein as the ratio of a resultant change in pitch angle to the change in flap angle (without driving any pitch actuators). If for example, a 3.0 degree change in pitch angle were induced by a 1.5 degree change in flap angle, the pitch flap coupling ratio would have the value 2.0, i.e., 3.0 divided by 1.5=2.0. It is possible to configure embodiments in which, even though the coupling ratio may be such as to (in the absence of other factors) produce a force tending to create a particular change in pitch angle, the actual change in pitch angle may be different. For example, with a somewhat resilient blade, blade flexing may change actual pitch angle. Some embodiments may include stop blocks or other devices tending to limit or modify what would otherwise be the actual pitch angle. Further, pitch actuator motions may, if desired, be employed to augment those pitch motions induced by the blade flapping motion.

The coupling of pitch angle to flap angle can have a number of useful features including limiting extreme loads and blade excursions, potentially making it possible to provide smaller, lighter-weight blades, towers or other components, reduced fatigue, reduced maintenance and replacement, increased life, reduction of power excursions and torque surges and/or increased efficiency generally as described in U.S. Pat. No. 5,584,655. One of the consequences of using a particular pitch angle is the effect the pitch angle has on the amount of useful energy which is derived from the wind. When the coupling ratio is a constant value, e.g., as depicted in FIG. 3, the value used for the coupling ratio typically will represent a compromise between various factors (such as a compromise between the desire to extract maximum energy and the desire to avoid blade and/or power excursions and the like).

Figure 4:
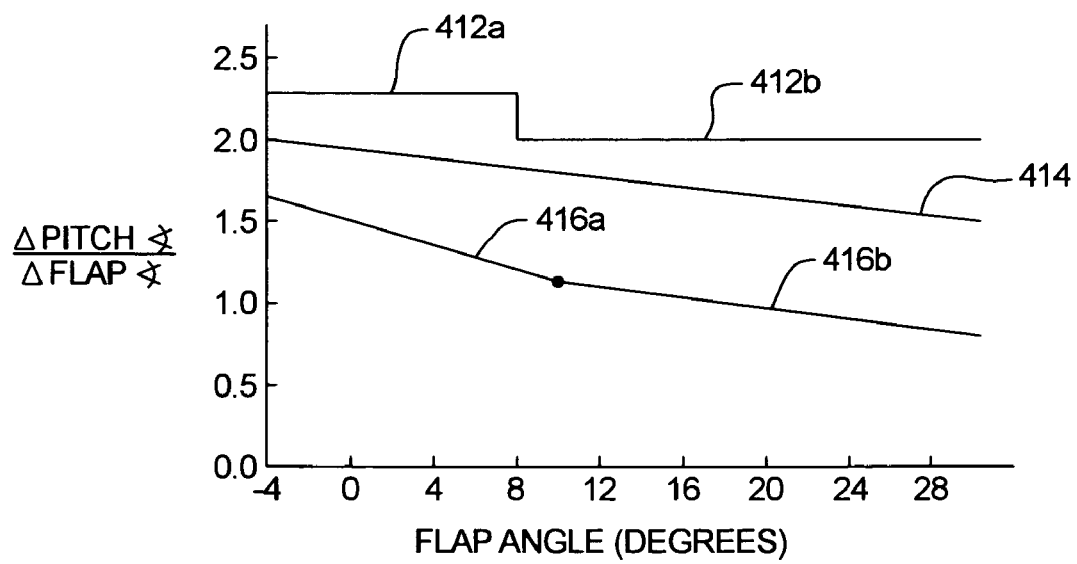
FIG. 4 is a graph illustrating coupling ratio as functions of flap angle, for a variety of possible non-constant coupling ratios.

The present invention includes a recognition that, for a system in which flap and pitch angles are coupled, some of the potentially less-than-optimal effects of compromising among various factors can be reduced or eliminated by providing a coupling ratio which varies (e.g., as a function of flap angle) in certain advantageous ways, including as described herein. FIG. 4 illustrates some potential ways in which a coupling ratio can be non-constant. In the example illustrated by curve 412a, 412b, the coupling ratio has a first constant value in the range of flap angles from –4 degrees to 8 degrees and a second constant coupling ratio 412b for flap angles above 8 degrees. In the example illustrated by line 414, the coupling ratio is non-constant, but linear (i.e., has a constant slope) through a range of flap angles. In the example illustrated by curve 416a, 416b, the coupling ratio has a first (constant) non-zero slope in a first range of flap angles (as illustrated, from –4 degrees to 10 degrees) and a second constant, non-zero slope in a second range of flap angles (in the illustration, from 10 degrees to 28 degrees).

FIG. 5 illustrates a plurality of coupling ratio curves, each associated with a particular crank arm ("step") position and associated actuator position, which are non-constant and non-linear throughout a range of flap angles, in accordance with one embodiment of the present invention.

It is believed that, in general, by providing a coupling ratio which has increased magnitude and/or rate of change (compared to other approaches), a degree of flexibility is provided in wind turbine design. For example, it is possible to design a wind turbine which, for low flap angles, responds to a wind gust by automatically providing a blade pitch which tends to fly the blade away from potential contact with the tower (e.g., changes the blade lift in such a manner that the aerodynamics tend to move the blade away from the tower). Although this effect can also be at least partially achieved with lower value coupling ratios, a coupling ratio which has a value sufficient to achieve the desired "fly away" from the tower effect at a low flap angle may, if the rate of change of coupling ratio is low, provide a less-than-optimal coupling ratio at other (higher) flap angles. As one example, it is believed that if, for a particular design, a coupling ratio of 1.2 is sufficient, when the flap angle is –4 degrees, to substantially avoid tower strikes, a ratio relatively close to 1.2 may be too large for optimal results when the flap angle is larger (e.g., there may be less power extraction than might otherwise be achieved).

In contrast, in the illustration of FIG. 4, it is possible to select a first coupling ratio 416a, large enough to achieve the desired "fly away" effect, in a low flap angle range, yet provide a smaller coupling ratio 416b, e.g., for extracting a greater amount of energy, when the flap angle is larger (and the risk of gust-induced tower strikes is smaller).

A further feature of the coupling ratio profiles shown in FIG. 5 is the relatively high values of coupling ratio that can be achieved for low (e.g. negative) flap angles. For example it is believed particularly useful that at, e.g. a −4 degree flap angle, intermediate extension of the pitch actuator, e.g. as shown by curve 518, has a relatively high value (in this case, approximately 2.4), and is greater than the corresponding value for the curve 512 representing the "start" position of the pitch actuator.

Figure 6A:
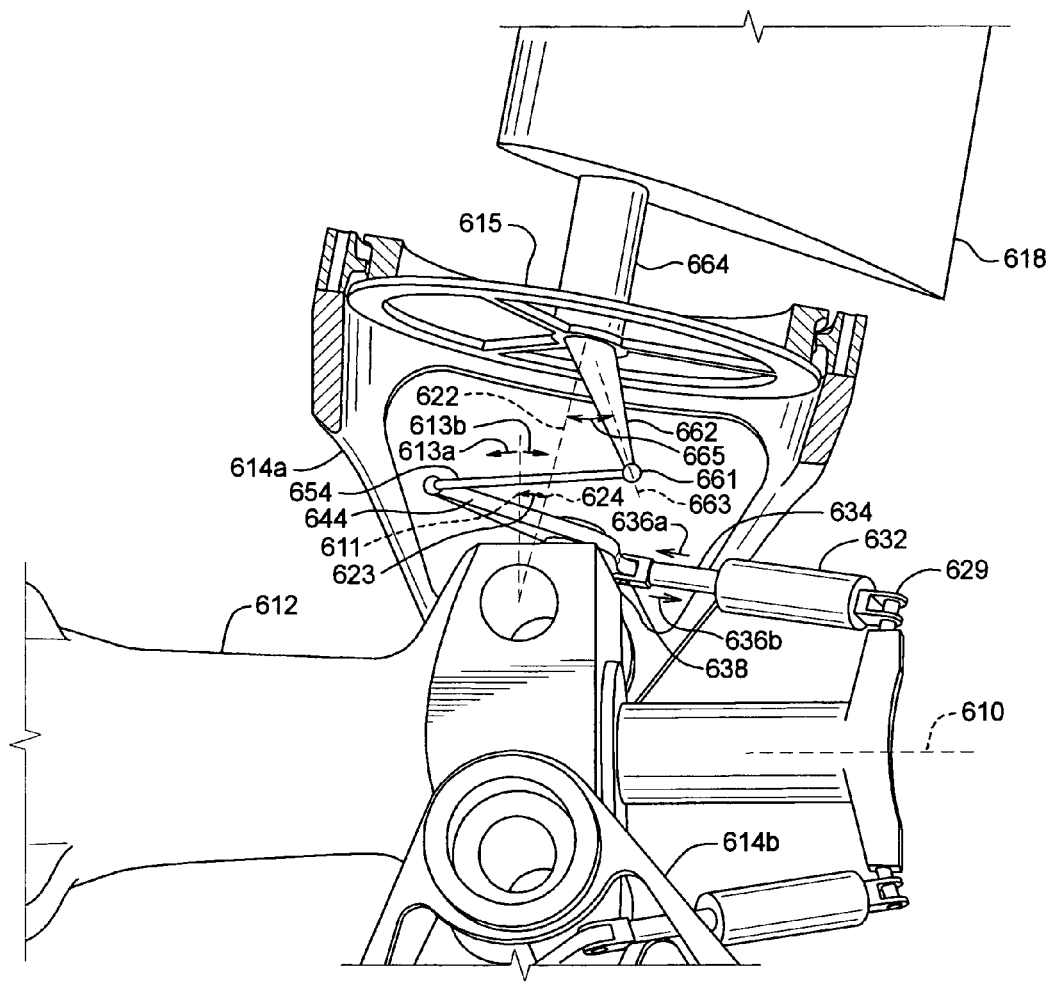
FIG. 6A is a partial side-perspective view of the end of a rotor and blade attachments with a first flap angle and a first actuator extension.

A number of systems or mechanisms can be used to achieve the desired non-constant coupling ratio. FIGS. 6A-C, 7A-C, 8A-C, 9A-C and 12 illustrate a substantially mechanical system which achieves a non-constant coupling ratio. In the illustration of FIG. 6A, first and second blade supports 614a, (shown partially broken away) 614b are coupled to a rotor shaft 612 (which defines a shaft longitudinal axis 610) in a manner to permit pivoting about axes 600 perpendicular to the rotor axis 610. The blade supports 614a, 614b each support a blade 618, with each blade being capable of rotation via a rotation ring 615 about a longitudinal blade pitch axis 622, defining a blade pitch 621 between the blade pitch axis 620a and a reference axis 620b which lies in a plane perpendicular to the rotation axis 610 (FIG. 6C). Each blade support 614a, 614b defines a longitudinal axis 624 which is parallel to, and preferably co-linear with, the pivot axis 622. The flap angle of a blade is defined by the angle 623 between the blade support axis 624 and a line 611 perpendicular to the rotor axis 610. As used herein, the flap angle is zero when the blade support axis 624 (or blade longitudinal axis 622) is perpendicular to the rotor axis 610, has negative values when the flap angle is such that the blade is inclined in a direction 613a toward the tower and has a positive value when the blade is inclined in a direction 613b away from the tower (as illustrated in FIG. 6A).

In the embodiment of FIG. 6A, a pitch actuator 632 which can be, e.g., a controllable hydraulic cylinder, controls movement of a crank arm 634, to linearly move the crank arm 634 so as to extend 636a or retract 636b the crank arm (or, if desired, to maintain the crank arm 634 in an unchanging extension state for a period of time.) The distal end 638 of the crank arm 634 is pivotally coupled to a first arm 642 of a bell crank 644 (FIG. 6C). The bell crank 644 is pivotally mounted on a bell crank spindle 646 (FIG. 6B) so as to pivot about said spindle 646. The distal end 648 (FIG. 6C) of the second arm 652 of the bell crank 644 is pivotally coupled to the proximal end of a connecting rod 654. The other (distal) end of the connecting rod 654 is pivotally coupled to a first end 661 of a pitch arm 662. The pitch arm 662 is rigidly attached with respect to the shaft 664 of the blade 618 (FIG. 6A) and has an axis 663 which is at an angle 665 with respect to the blade longitudinal axis 622 or is otherwise offset from the longitudinal axis.

Without wishing to be bound by any theory, it is believed that the geometric interrelationship between the rotation axis of the shaft or hub, the flap axis, the crank attachment (pitch arm) and/or the connecting rod axis substantially governs the pitch-flap coupling ratio characteristics of the mechanism.

For purposes of describing the present invention, unless otherwise indicated, the terms "proximal" and "distal" are used with respect to the direction of linkage or train of pitch change components ending at the blade pitch axis. Thus, in the context of FIG. 6A, the end of the connecting rod 654 which is connected to the pitch arm 662 is the distal end, and the end of the connecting rod 654 which is connected to the bell crank 644 is the proximal end.

One feature of the embodiment of FIGS. 6-12 which is believed especially useful in achieving desired coupling ratio profiles (such as depicted, e.g., in FIG. 5), is that the proximal end of the member which acts on the pitch arm 662, i.e. the proximal end 653 of the connecting rod 654, (and specifically, the line defining the pivot axis between the proximal end of the connecting rod 654 and the bell crank 644) is movable, with respect to the blade longitudinal axis 622. The proximal end 653 of the connecting rod 654 is also movable with respect the rotor shaft 612 and with respect to the flap axis 600. For example, the location of the proximal end of connecting rod 654, for the configuration shown in FIGS. 6A-C, is different from the location of the proximal end of connecting rod 654 for the configuration shown in FIGS. 7A-C. Similarly, the location of the proximal end of connecting rod 654, for the configuration shown in FIGS. 6A-C, is different from the location of the proximal end of connecting rod 654 for the configuration shown in FIGS. 8A-C, and is different from the location of the proximal end of connecting rod 654 for the configuration shown in FIGS. 9A-C.

In contrast, previous approaches having adjustable pitch typically provide that the member attached to the pitch arm have their proximal end in a fixed location with respect to the pitch axis, flap axis, and/or the rotor shaft. In this context, the proximal end is fixed if the line or axis of connection of the proximal end, to an attachment position, is fixed, even though the member may pivot about the axis (e.g. to accommodate flap).

The depicted embodiment provides both higher values of pitch-flap coupling ratio and more aggressive change in pitch flap coupling ratio, (compared to previous approaches) especially for near cut-out conditions. In the depicted embodiment, across the flap angle range from +4 degrees flap angle to −4 degrees flap angle, the pitch-flap coupling ratio increases from 1.8 to 2.4, corresponding to a 33 percent increase. Computer simulation analysis indicates that, for wind turbine operation in the vicinity of cut-out wind speed, relatively high values of pitch-flap coupling ratio and/or relatively aggressive rates of change in pitch-flap coupling ratio are especially beneficial for controlling blade flap motion.

The embodiment of FIGS. 6-9 can provide a number of advantages and features including, e.g., 1) an ability to achieve a desirably large coupling ratio (such as greater than 1, preferably greater than 1.5 and more preferably greater than 2, especially for low (e.g., less than about 4 degrees) flap angles and/or near cut-out conditions (near-feather pitch angles); 2) a desirably large rate of change of coupling ratio (as a function of flap angle) such as a change across a range from −4 degrees flap to +4 degrees flap, of about 15 percent, preferably about 20 percent and more preferably about 28 percent or more); and/or, 3) a link proximal end pivot which is movable with respect to the flap axis.

Another advantage of embodiments of the present invention has to do with the stationary or parked rotor condition with feather pitch position. In this situation it is desirable for the pitch flap coupling ratio to be as near zero as feasible and nearly constant over the full range of flap angle. Previous approaches typically had a steeply increasing value of pitch flap coupling ratio e.g. from 0.6 at −4 degrees flap angle to 2.0 at +22 degrees flap angle. In contrast, as shown in FIG. 5, for near-end or near-feather pitches 534 there is a pitch flap coupling ratio of 0.5 at −4 degrees flap and a nearly linear increase to 0.7 at +22 degrees flap angle. As a result, the variation of pitch with variation in flap angle at feather pitch position is significantly less for the depicted embodiment, compared with typical corresponding variation in previous approaches.

Figure 6B:
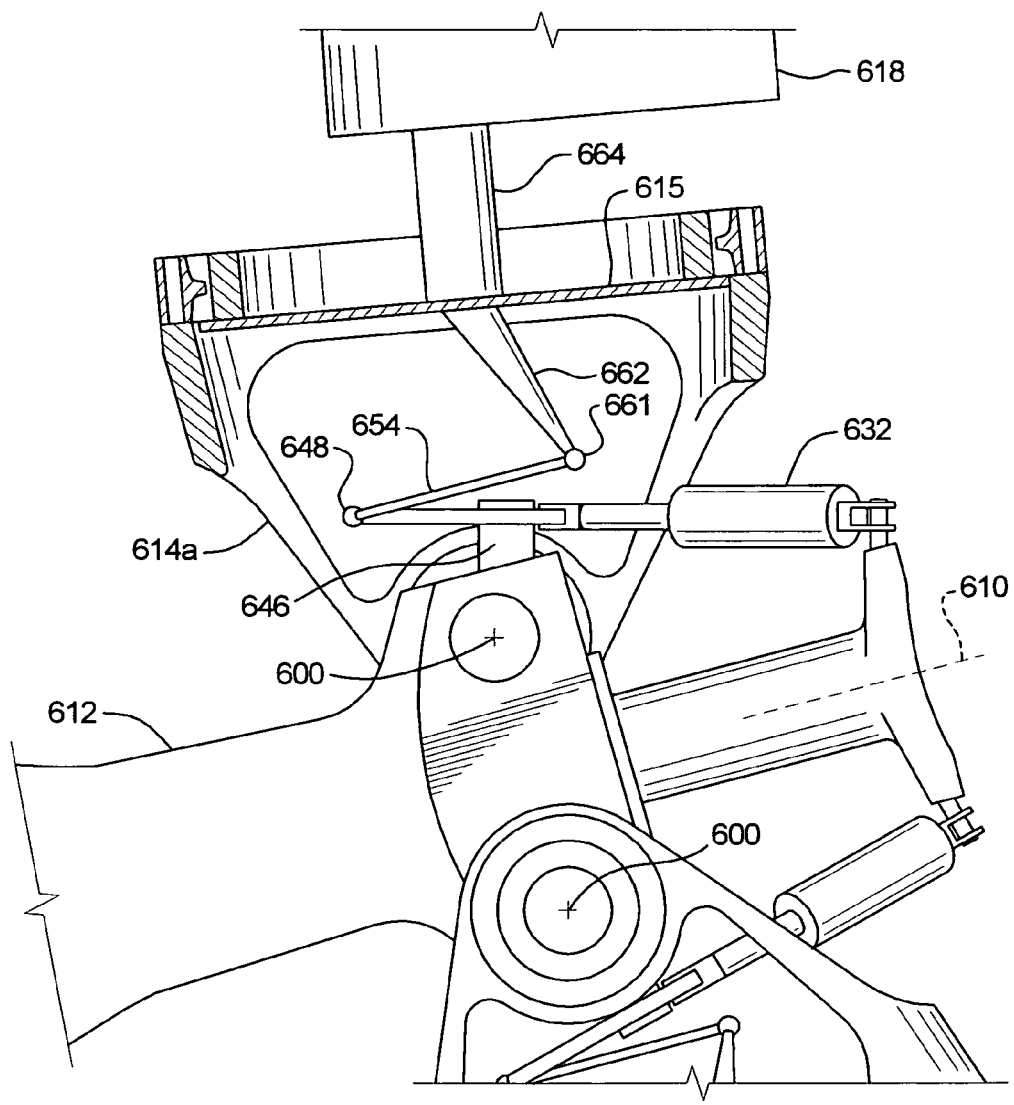
FIG. 6B is a side elevational view corresponding to FIG. 6A with the bell crank horizontal, with the upper blade support partially broken away.
Figure 7A:
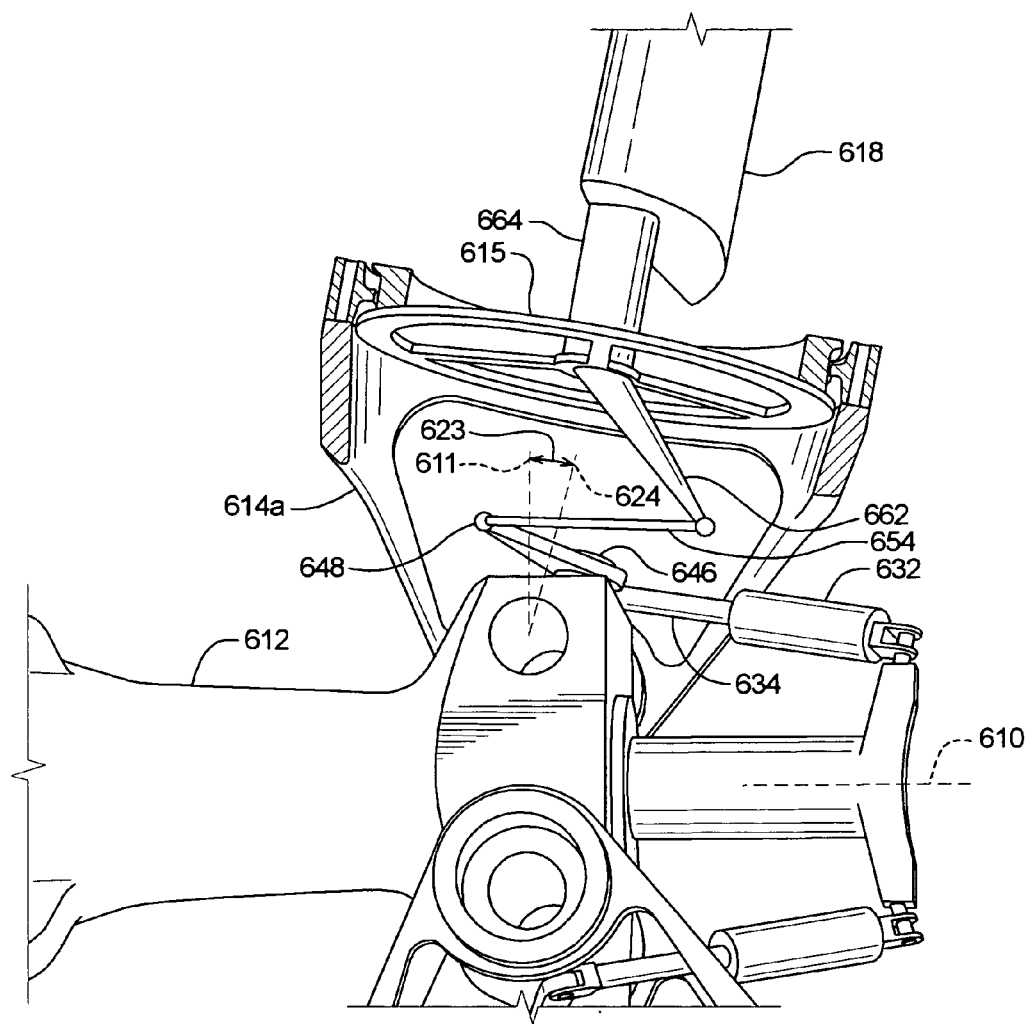
FIGS. 7A-C correspond to FIGS. 6A-C, respectively, but with a second, larger actuator extension.
Figure 7B:
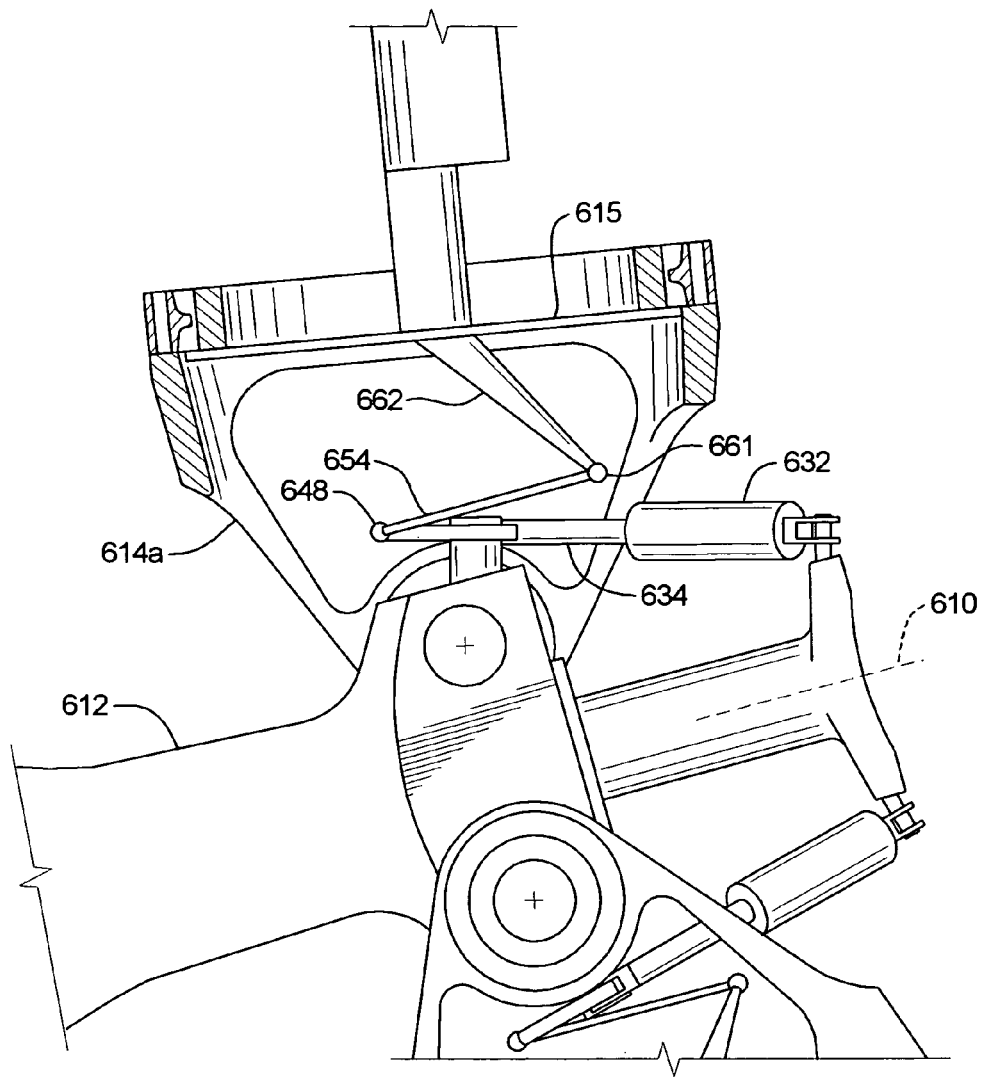
Figure 7C:
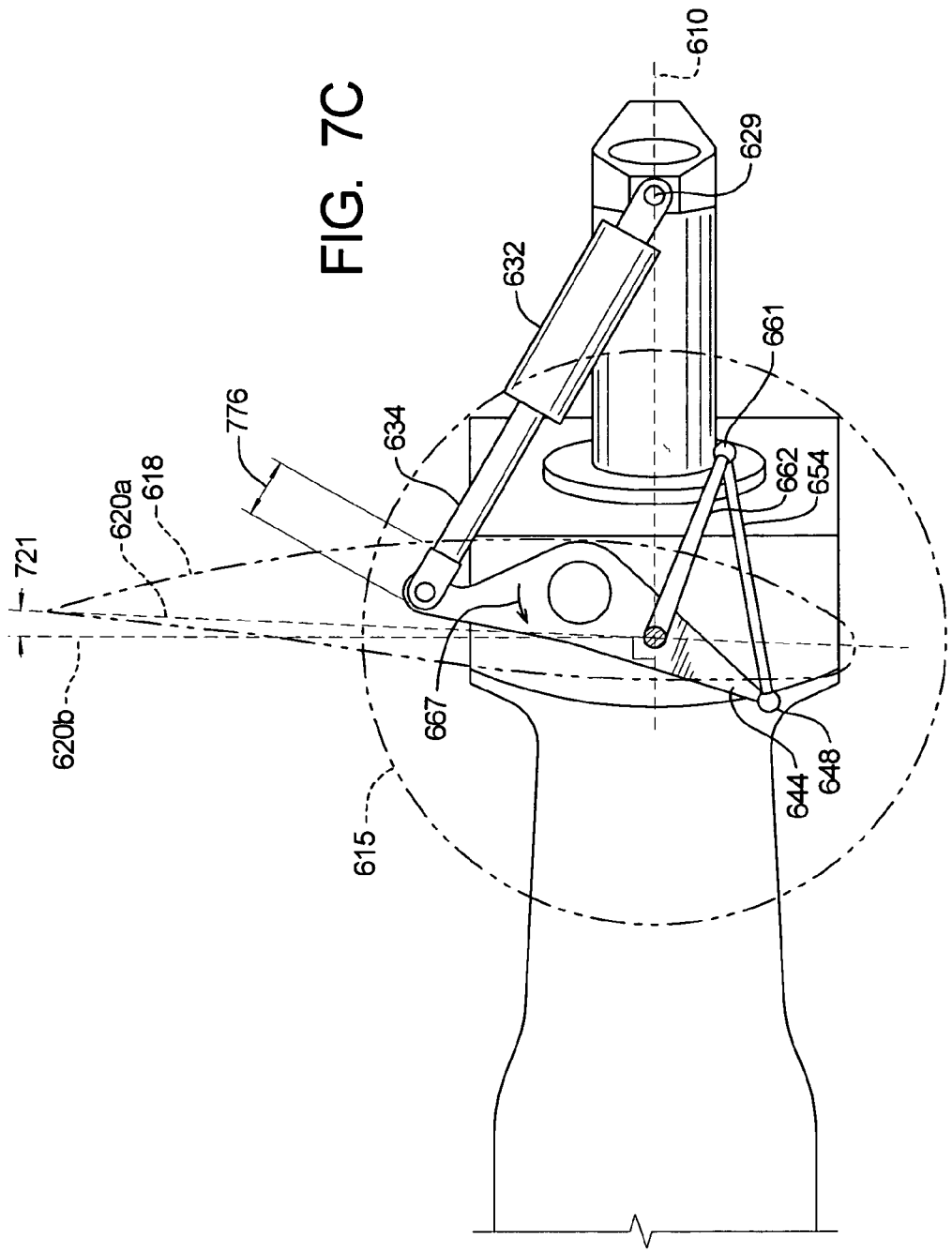

A comparison of FIGS. 6A-C with FIGS. 7A-C illustrate how, for a constant flap angle, extension 636a of the crank arm 634 by the pitch actuator 632 causes a change in the blade pitch. Specifically, extension of the crank arm 634 from the configuration shown in FIGS. 6A-C to the configuration shown in FIGS. 7A-C causes the bell crank 644 to pivot counterclockwise 667 (in the view of FIG. 7C), about the spindle 646. Because of this motion, the connecting rod 654 pushes on the offset pitch arm 662 causing it to move in a manner (seen by comparing FIGS. 6C and 7C) so as to rotate the blade 618 about its longitudinal axis 622 and thus change the blade pitch 721. The flap angle 623 of FIGS. 7A-C is the same as that of FIGS. 6A-C.

Figure 8A:
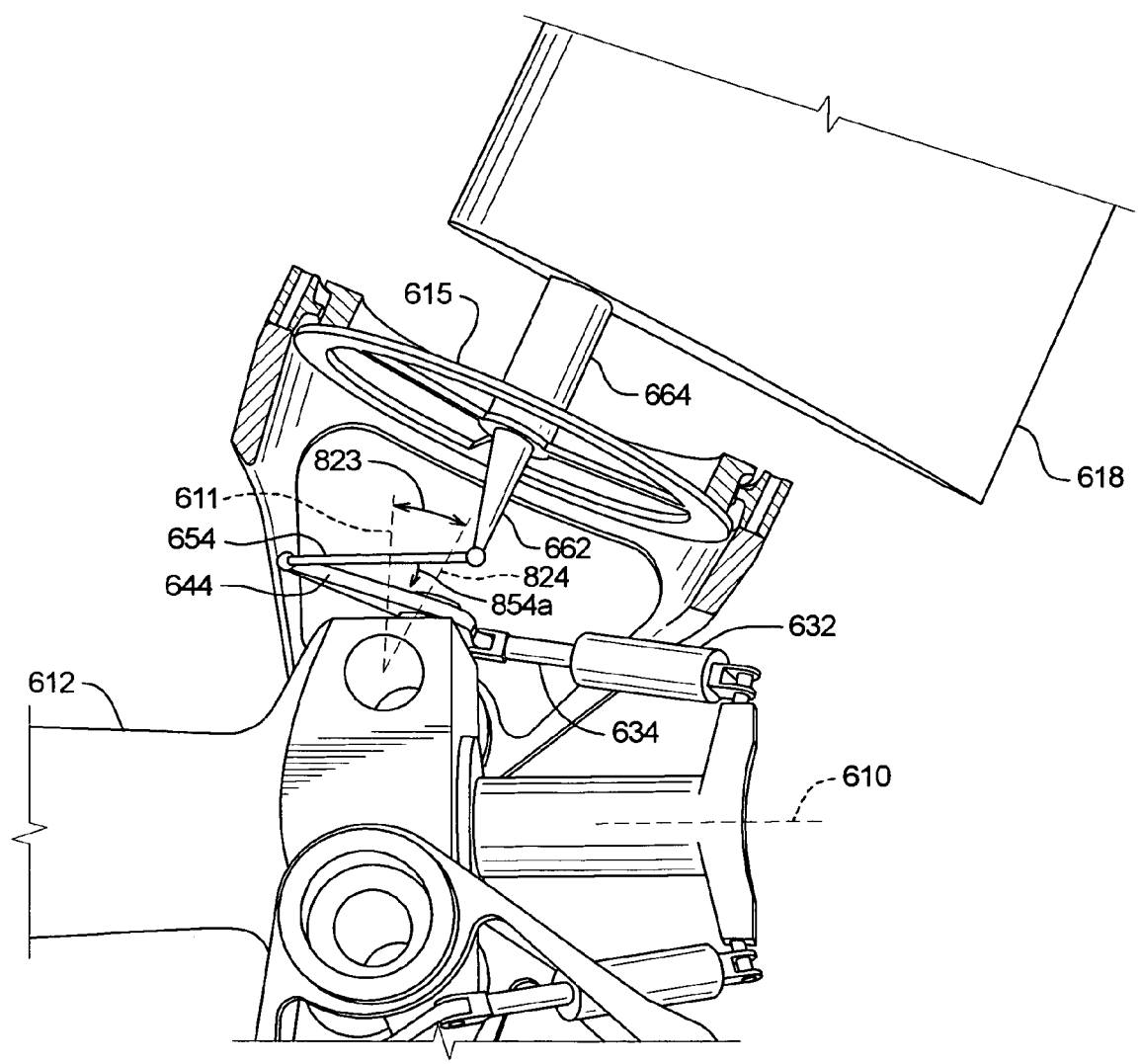
Figure 8B:
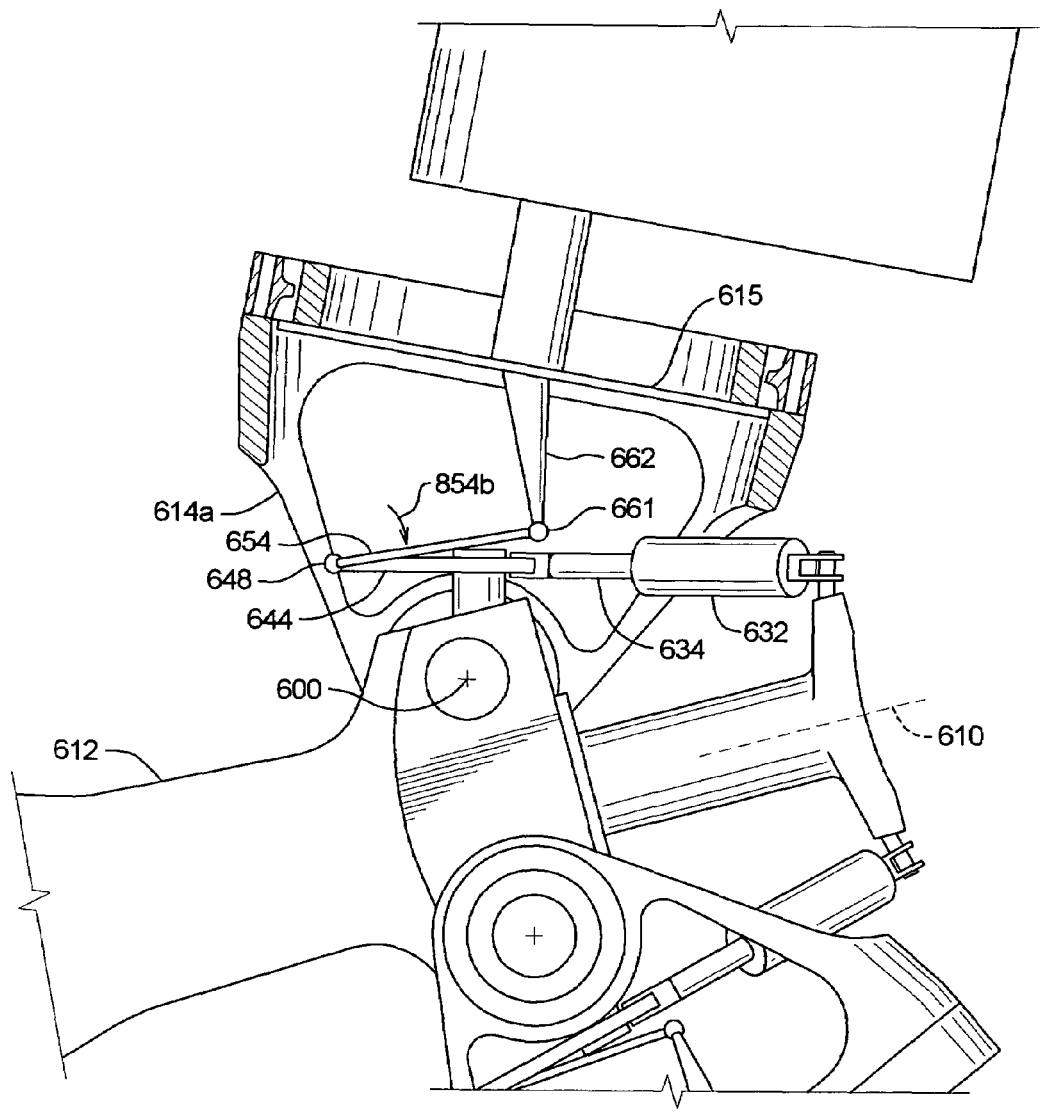

A comparison of FIGS. 6A-C with FIGS. 8A-C shows that (other factors held constant) a change in flap angle automatically creates a certain amount of change in pitch (with the magnitude of such a change in pitch being determined by the coupling ratio, as discussed herein). The pitch motion induced by the flapping motion is independent of pitching motions induced by the pitch actuator, i.e., in the presence of flapping motion, pitch motion will occur even in the absence of pitch actuator motion. FIGS. 8A-C have the same crank arm extension as FIGS. 6A-C but have a larger flap angle 823 (based on the axis 824 of the blade support in its new position) than FIGS. 6A-C. Although the crank arm 634 does not extend, the pivoting of the blade support 614a (from FIGS. 6A-C to FIGS. 8A-C) causes a change 854a, b, c in the position of the connecting rod 654 with respect to the bell crank 644 (seen by comparing FIGS. 6A-C with FIGS. 8A-C, respectively). The change in position of the connecting rod 654 results in the connecting rod 654 pushing on the offset end 661 of the pitch arm 662, causing the blade 618 to rotate 872 about its longitudinal axis, defining a new pitch angle 821.

Figure 9A:
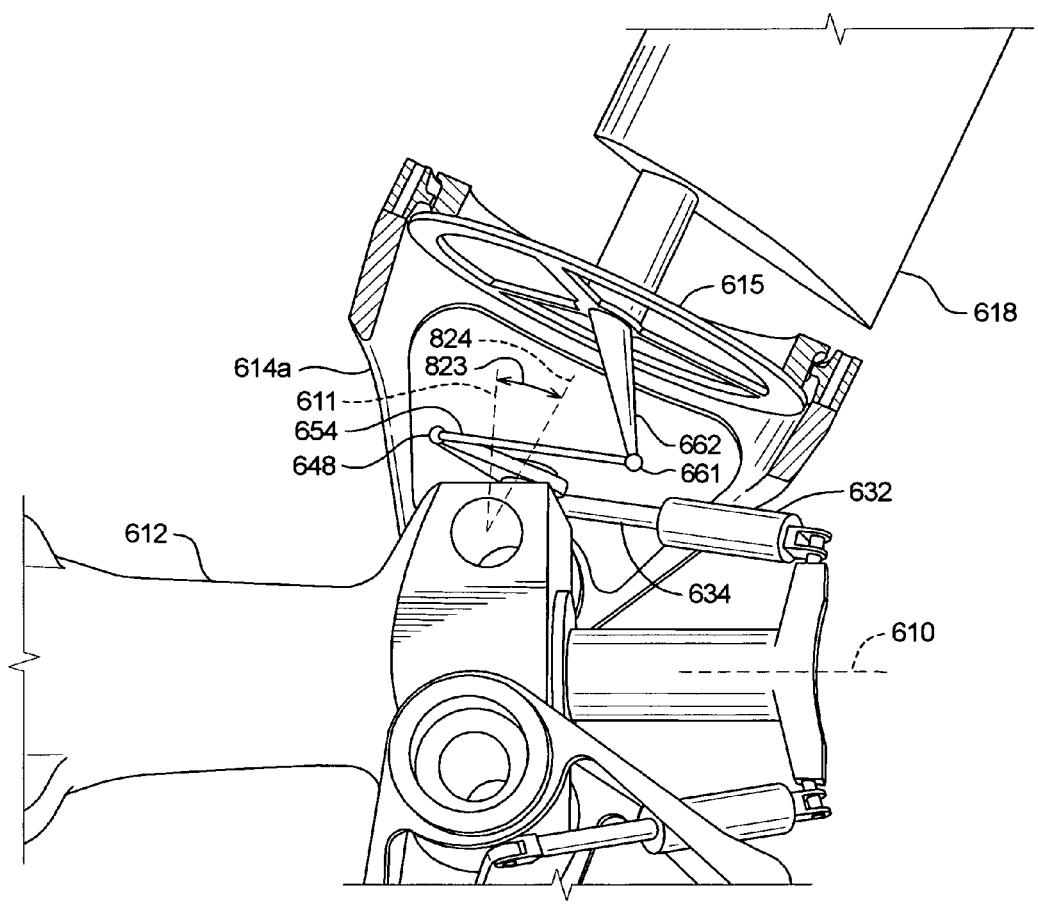
FIGS. 9A-C correspond to FIGS. 8A-C, respectively, but with said second, larger actuator extension.
Figure 9B:
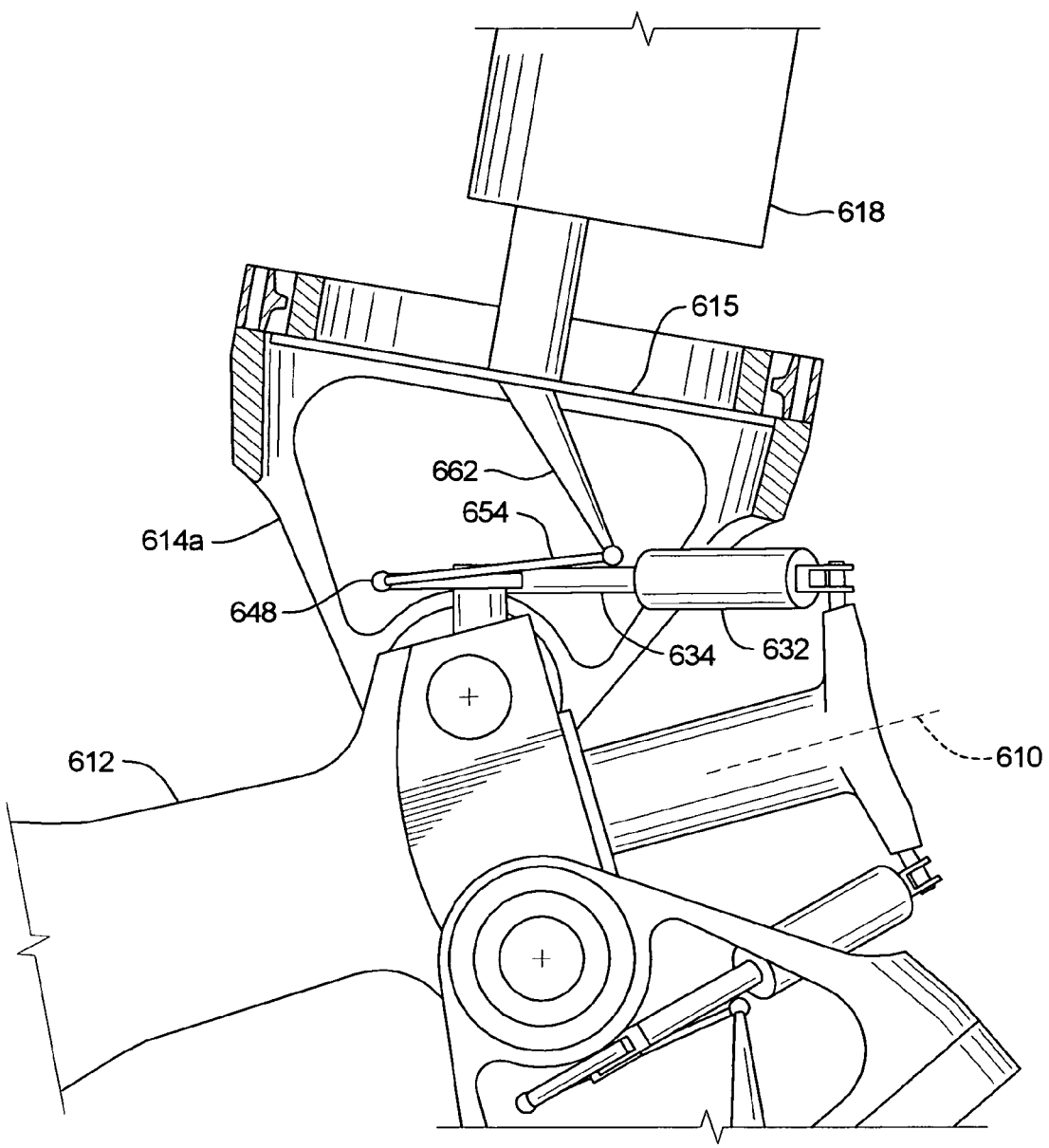
Figure 9C:
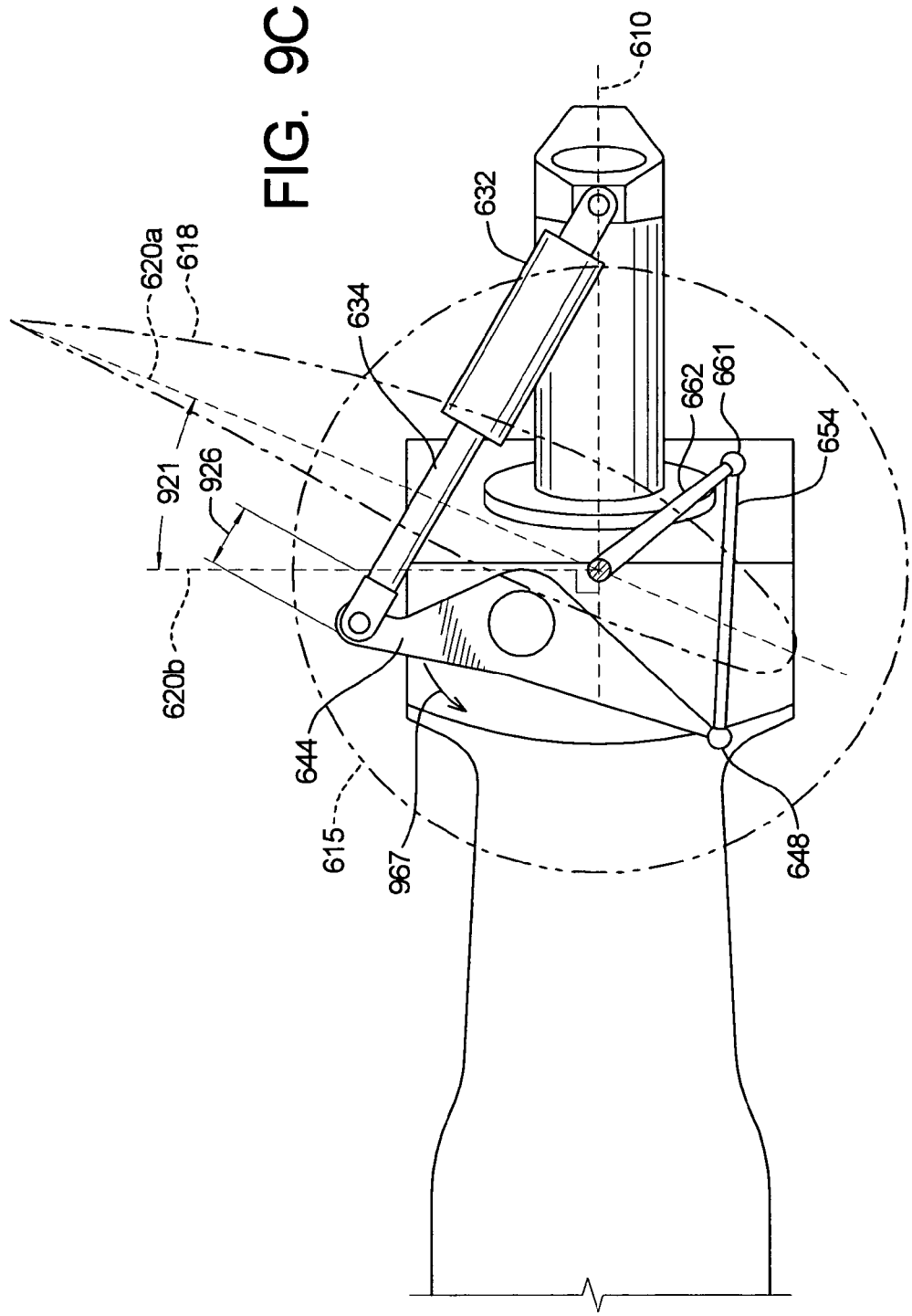
Figure 12:
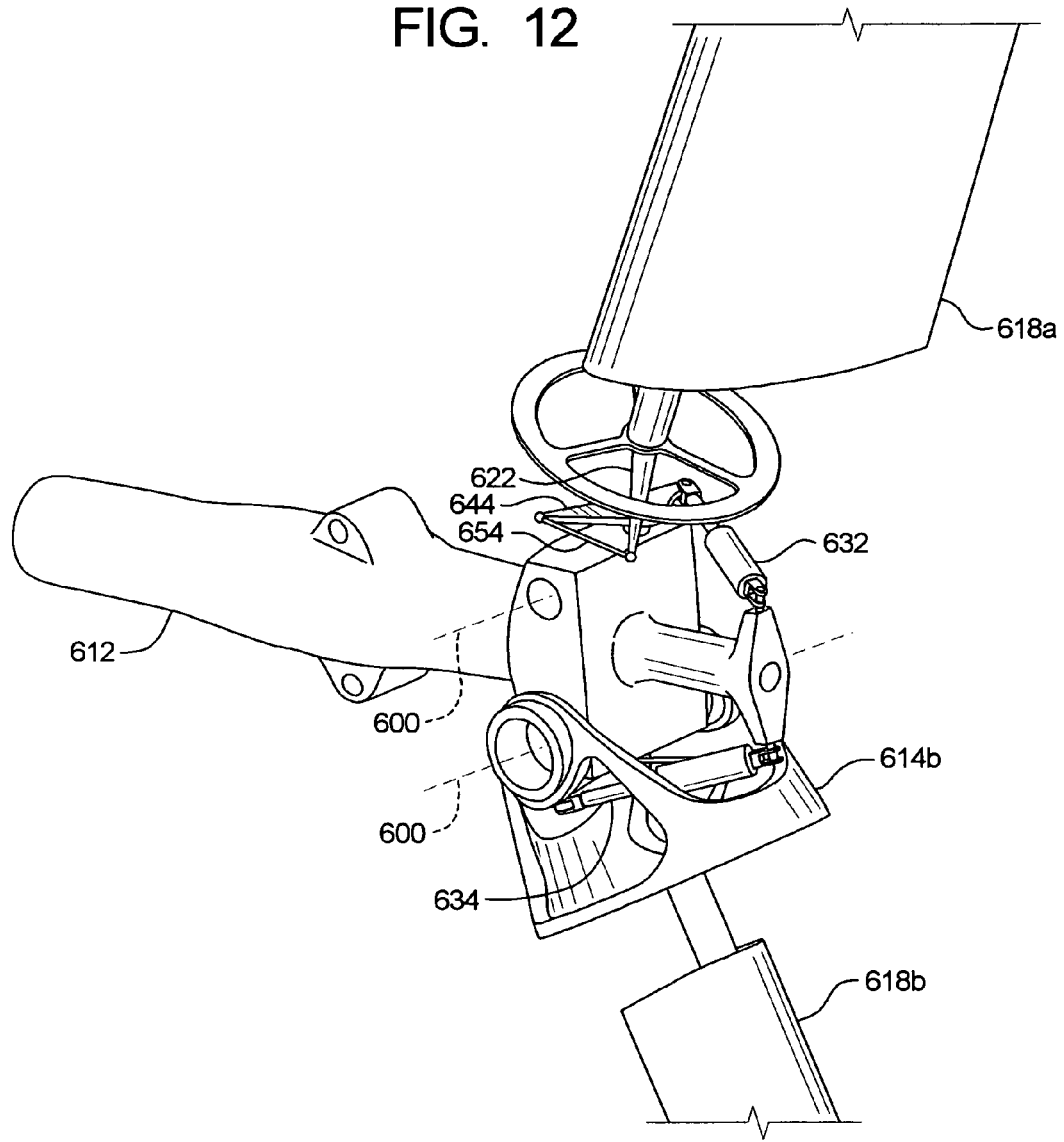
FIG. 12 is a perspective view of the end of a rotor and blade attachments, generally as shown in FIG. 6A, with the upper blade support removed.

One aspect of the coupling ratio provided by the depicted embodiment, can be seen by comparing how the blade pitch changes from that 621 shown in FIGS. 6A-C to that 721 shown in FIGS. 7A-C (while the flap angle is unchanged and relatively shallow) versus how the pitch changes from that 821 shown in FIGS. 8A-C to that 921 shown in FIGS. 9A-C. FIGS. 9A-C have the same flap angle 823 as FIGS. 8A-C. However, FIGS. 9A-C have the crank arm 634 extended an amount 976 (compared to the position of the crank arm 634 in FIGS. 8A-C) which is equal to the amount 776 that the crank arm is extended in FIGS. 7A-C (compared to the position of the crank arm 634 in FIGS. 6A-C). Table I shows the pitch and flap angles for the example illustrated in FIGS. 6A-C through FIGS. 9A-C.

FIGS. 6A-C through 9A-C illustrate how the magnitude of change in pitch angle, in reaction to a given flap angle change (without any change in actuator or crank arm position), is different depending on the flap angle. It can also be seen, from FIGS. 6A-C through 9 A-C, that the magnitude of changes in pitch angle (in reaction to a given crank arm extension) varies depending upon the flap angle. In the device illustrated in FIGS. 6A-C through 9A-C, if one begins with a flap angle of −4 degrees and the actuator crank arm is maintained by the pitch actuator in a fixed position corresponding to cut-out wind speed position, 518 in FIG. 5 and 1018 in FIG. 10, then a change in the flap angle of 1 degree induces a change in pitch angle of 2.4 degrees. However, if one begins with a flap angle of 25 degrees, then a change in flap angle of 1 degree induces a change in pitch angle of 1.1 degrees, i.e., the coupling ratio has different values for different flap angles.

TABLE I

| | FIGS. 6A-C | FIGS. 7A-C | FIGS. 8A-C | FIGS. 9A-C |
| --- | --- | --- | --- | --- |
| Pitch Angle | 36.7 degrees | 2.6 degrees | 55.2 degrees | 23.4 degrees |
| Flap Angle | 10 degrees | 10 degrees | 25 degrees | 25 degrees |

A substantially mechanical coupling is believed to provide a number of features which are useful. The mechanical coupling system provides substantially instantaneous (i.e., substantially zero lag) response (i.e., there is substantially zero time lag between a change in flap angle and a resultant change in pitch angle). A mechanical system such as that illustrated is believed to be readily manufacturable and amenable to many mass production procedures and it is believed to have relatively low costs of design, maintenance and/or repair, compared to other approaches.

Although the mechanical approach illustrated in FIG. 6A and FIGS. 13A-C and 14A-C involves linkages, other substantially mechanical systems can achieve a desired coupling ratio relationship and/or a movable proximal end of the member that acts on (or is coupled to) the pitch arm (or a corresponding component) including systems involving gear trains, pulley trains and the like. Other potential approaches to providing desirable coupling ratio profiles include providing separate positive drives or sensors for the flap angles and/or pitch angles and coordinating these drives or sensors, such as by using an electronic control for the coordinated driving of flap angle changes and pitch angle changes and/or for driving pitch angle changes in response to sensed flap angles and the like. Driving and/or sensing mechanisms can include, e.g., hydraulic components, pneumatic components, electronic and/or electro-mechanical components such as motors, linear actuators and the like. Those of skill in the art will understand how to select and/or make and use various embodiments of the present invention, including as described, at least after understanding the present disclosure.

FIG. 5 illustrates, for the system illustrated in FIGS. 6A-C through FIGS. 9A-C, the numerically modeled relationship of the (dimensionless) pitch to flap (coupling) ratio (shown on the vertical axis) to flap angle in degrees (shown on the horizontal axis) for a number of different extensions of the crank arm 634. Curve 512 illustrates the modeled change in coupling ratio (as function of flap degree) when the crank arm 634 is substantially fully retracted, corresponding to below rated power operation. Curves 514 through 532 illustrate the modeled change in coupling ratio as a function of flap angle for progressively larger amounts of crank arm extension. Curve 534 illustrates the modeled change in coupling ratio, as a function of a flap angle, when the crank arm 634 is extended to a "feather-pitch" position, normally associated with a stop or end operation of the wind turbine.

FIG. 10 illustrates the same modeled data as shown in FIG. 5 but with the vertical axis showing pitch angle, rather than pitch to flap ratio. Curves 1012 through 1034 correspond to Curves 512 through 534 of FIG. 5 respectively.

As can be seen from FIG. 10 and, particularly from FIG. 5, in at least the illustrated range of flap angles, the coupling ratio is non-constant, as a function of flap angle. Furthermore, the curve, defining the ratio as a function of flap angle, can be varied by changing the extension of crank arm 634. In the embodiment illustrated in FIG. 5, the coupling ratio is a continuous and non-linear function of flap angle. In the embodiment of FIG. 5, for at least some values of the crank arm extension such as 516 through 532, the graph of coupling ratio as a function of flap angle is substantially concave upward. For at least some range of extension of the crank arm, (such as Curves 516 through 532) the value of the coupling ratio for negative flap angles is larger than the coupling ratio for at least some positive angles.

FIG. 11 illustrates certain results of numerical modeling of the reaction of a wind turbine generally according to the illustration of FIGS. 6A-C through FIGS. 9A-C, under various modeled, gusty wind regimes. In the illustration of FIG. 11, the tick marks of the horizontal axis indicate various numeric modeling runs and the vertical axis indicates the minimum flap angle (in degrees) encountered during that model run. Data points indicated by a diamond are results achieved when the non-constant coupling ratio of FIG. 5 is used and data points indicated by a square are results from modeling when a coupling ratio generally as described in U.S. Pat. No. 5,584,655 is used. Various numeric modeling runs used different average wind speeds 1312a, 1312b, 1312c, and 1312d. Although Applicants believe the modeling results of FIG. 11 are useful for illustrating some of the benefits expected from the present invention, the model results should not be taken as an indication that such results are statistically significant or are fully representative of any real machinery or conditions. The numerical modeling results of FIG. 11 are believed to be most illustrative of expected benefits of the present invention for higher wind speed model runs. In particular, it can be seen that for 20 meter per second average wind speeds, models which were run with previous approaches indicated flap angles as low as −7 degrees, whereas, when an embodiment of the present invention is used, the model predicts that the flap angle will not fall below about a −1 degree (believed, e.g., to reduce the likelihood of tower strikes).

The coupling ratio curves shown in FIG. 5 are substantially determined by the geometry of the components illustrated in FIGS. 6A-C through FIGS. 9A-C including the location of attachment point 629 of the pitch actuator 632 (see FIG. 6A), the arm lengths 645a, 645b and included angle 647 of the bell crank 644 (see FIG. 6C), the length of the connecting rod 654, the length of the pitch arm 662 and the angular offset 665 of the pitch arm 662. Table II provides values for some of these parameters according to an embodiment of the present invention. However, it is believed that other values for some or all of these parameters can be used in operable embodiments of the invention. The parameter values provided in Table II result in a mechanism which achieves a progressive increase of the coupling ratio at least when extremes of wind turbulence cause flap angle excursions outside of normal operating bounds.

TABLE II

| | |
|---|---|
| Distance from spindle 646 to attachment 629 of actuator 632 | 65.8 cm |
| Bell crank first arm length 645b | 25.0 cm |
| Bell crank second arm length 645a | 35.0 cm |
| Bell crank angle 647 | 150 degrees |
| Connecting rod length 654 | 42.5 cm |
| Pitch arm length 622 | 42.5 cm |
| Angular Offset 665 of pitch arm 622 | 45 degrees |

Another approach to providing a substantially mechanical system for achieving a desirable set of coupling ratio profiles is shown in FIGS. 13A-C and 14A-C. The embodiment of FIGS. 13A-C and 14A-C differs from that of FIGS. 6A-C through 9A-C principally by the omission of the bell crank. That is, while the embodiment of FIGS. 6A-C through 9A-C has a pitch actuator 632 whose crank arm 634 is coupled to a bell crank 644, which is, in turn, coupled to a connecting rod 654, in the embodiment of FIGS. 13A-C and 14A-C, the crank arm 1334 of the pitch actuator 1332 is coupled directly to the proximal end 1353 of a connecting rod 1354. As before, the distal end 1355 of the connecting rod 1354 is coupled to the proximal end of a pitch arm 1362. The respective positions/configurations of selected components in FIGS. 13A-C and 14A-C are summarized in Table III.

TABLE III

| View | Pitch Actuator | Flap angle | Approximate Blade Pitch |
|---|---|---|---|
| 13A Along blade axis | Fully retracted | 0 degrees | 90 degrees |
| 13B Along blade axis | Partially extended | 0 degrees | 20 degrees |
| 13C Along blade axis | Fully Extended | 0 degrees | −14 degrees |
| 14A Perspective | Fully Extended | 0 degrees | −14 degrees |
| 14B Perspective | Fully Extended | 22 degrees | 20 degrees |
| 14C Perspective | Fully Extended | −4 degrees | −14 degrees |

Figure 13A:
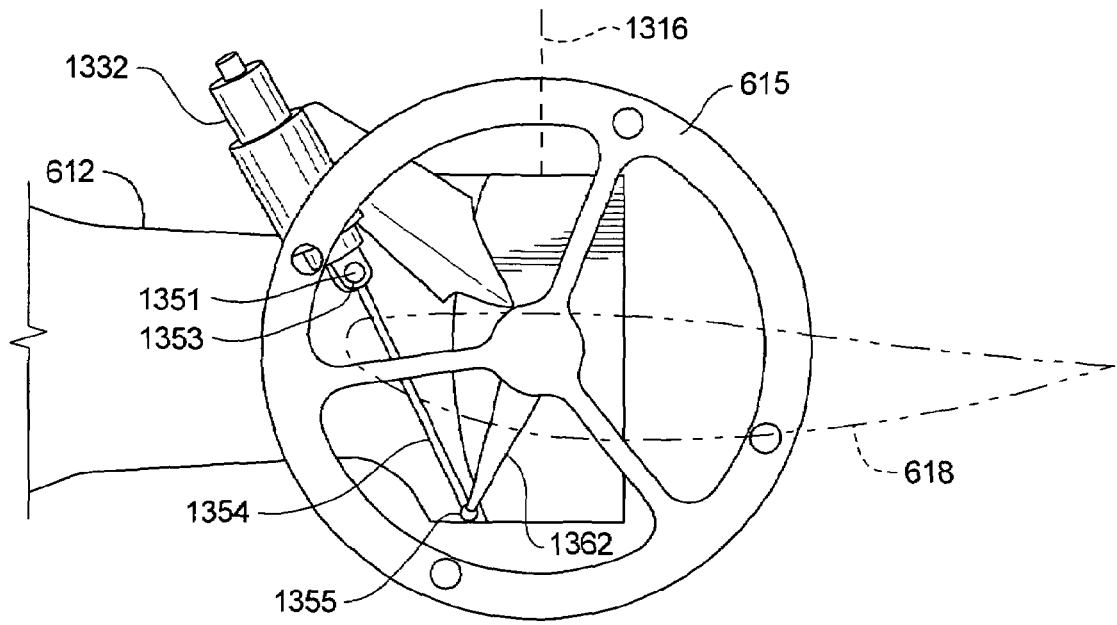
FIGS. 13A-C are top plan views of the end of a rotor and blade attachments, with blade support removed, for minimum, medium and maximum pitch actuator extensions, respectively; and, FIGS. 14A-C are perspective views, corresponding generally to FIG. 13C, but for first, second and third flap angles.
Figure 13B:
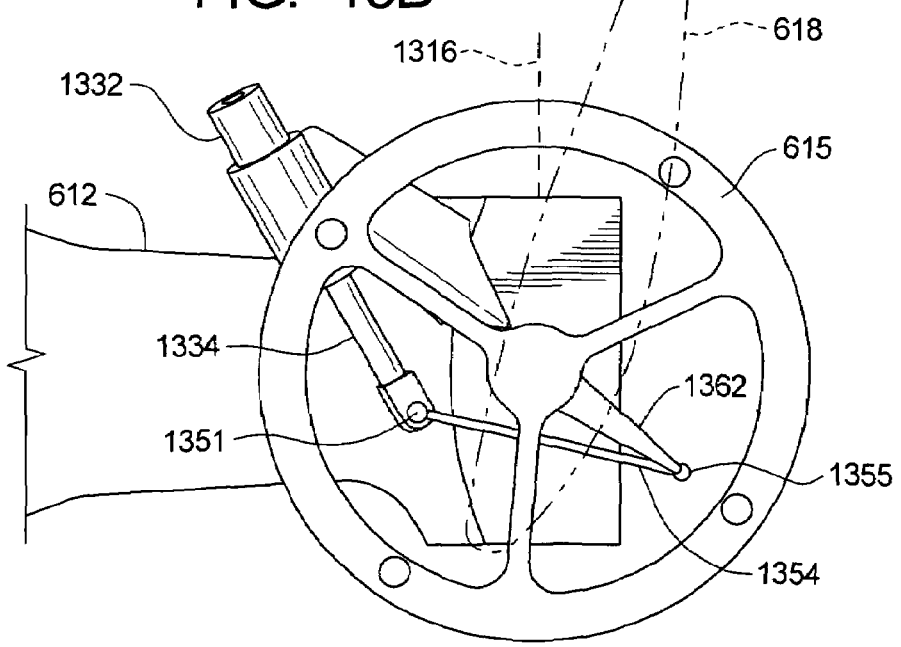
Figure 13C:
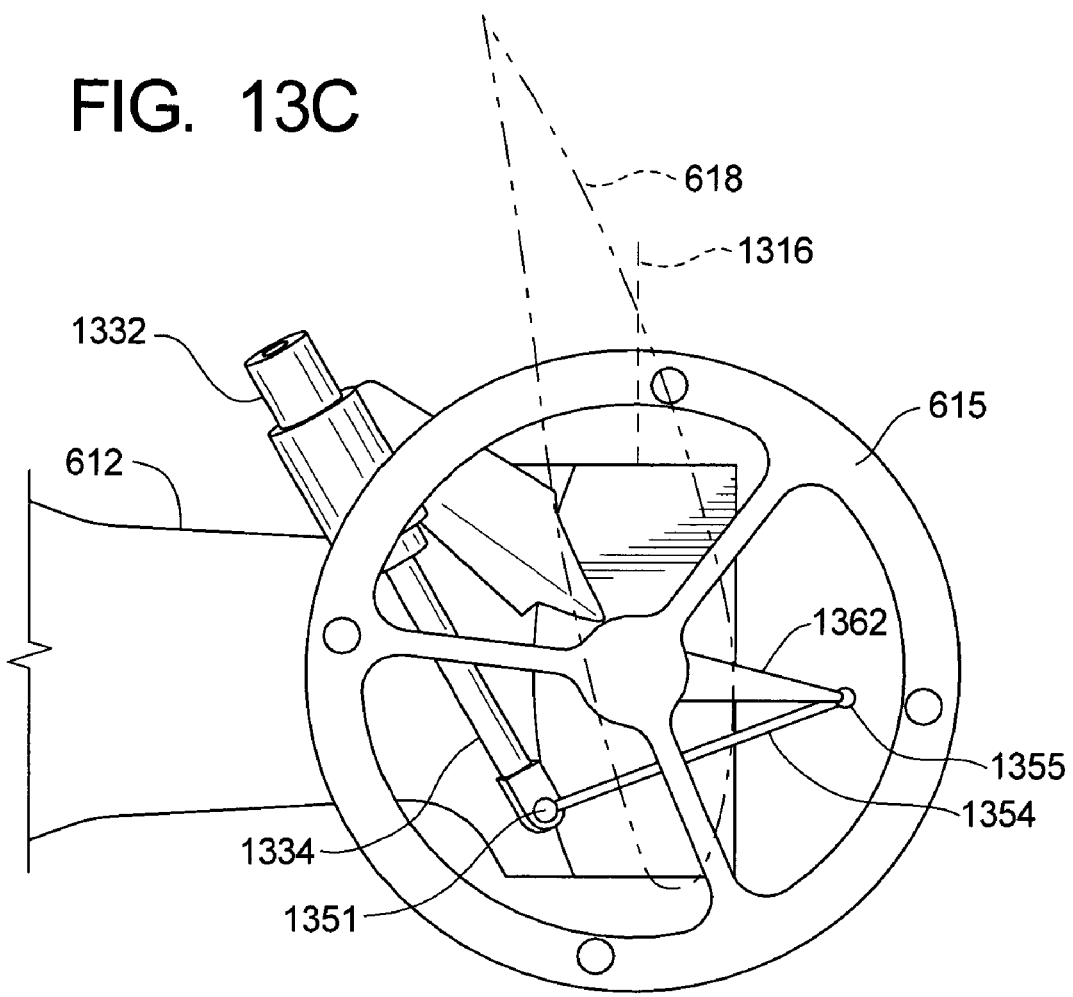

FIGS. 13A-C are views looking along the longitudinal axis of the blade (whose outline is shown in phantom) towards the rotation axis, with the blade support removed, for clarity. The flap angle is constant (at 0 degrees) in all of FIGS. 13A-C, but the pitch actuator is shown as moving from a fully retracted position (FIG. 13A) through an intermediate position (FIG. 13B) to a fully extended position (FIG. 13C), resulting in change of blade pitch through a range from 90 degrees to −14 degrees. It can be seen by comparing FIGS. 13A-C that the proximal end 1353 of the connecting rod 1354 is in different locations, and, in particular, the pivot axis 1351 (where the coupling rod 1354 is pivotably coupled to the crank arm) is in different locations with respect to the crank arm 1334 and is movable with respect to the flap axis 1316.

Figure 14A:
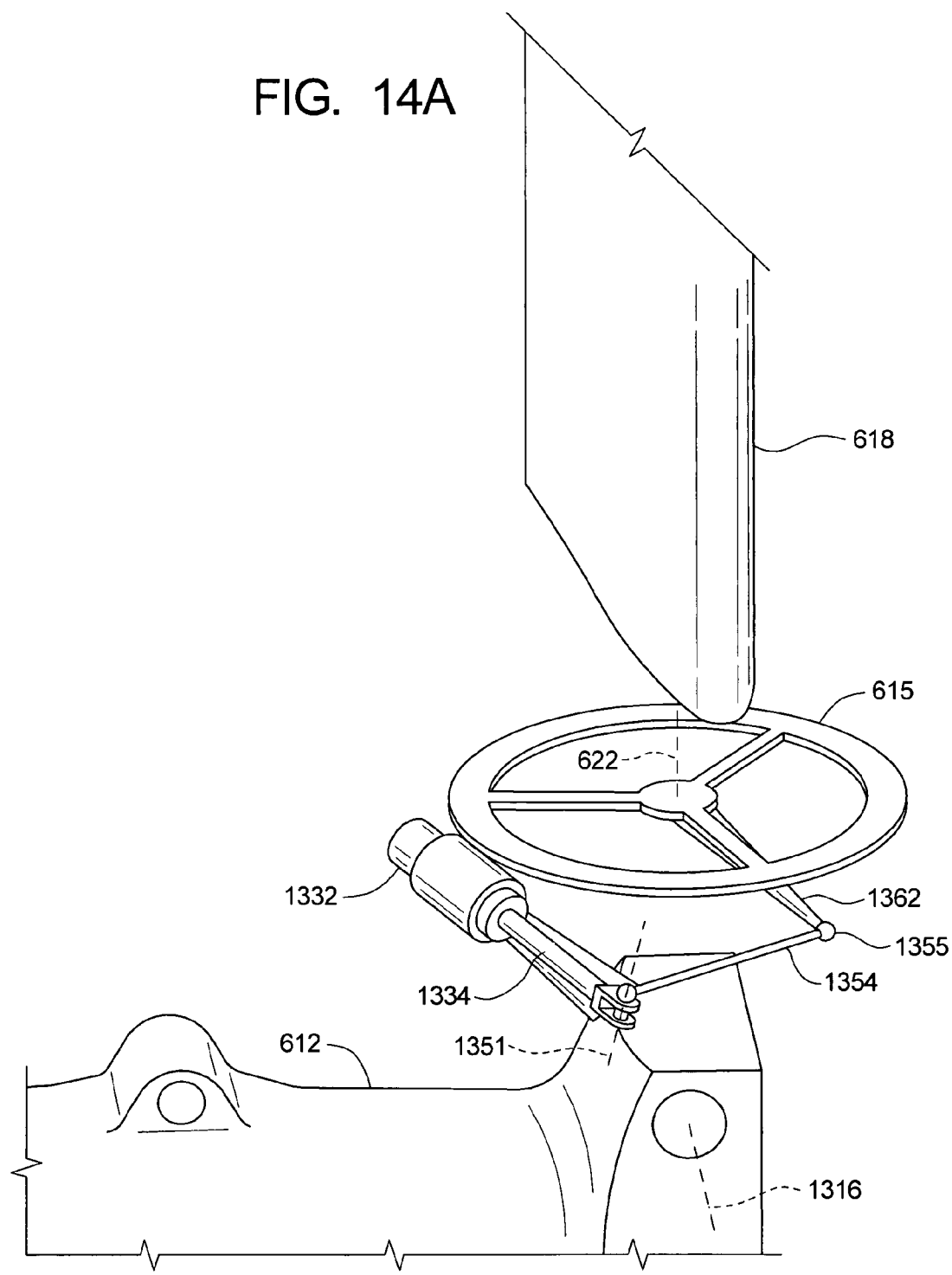
Figure 14B:
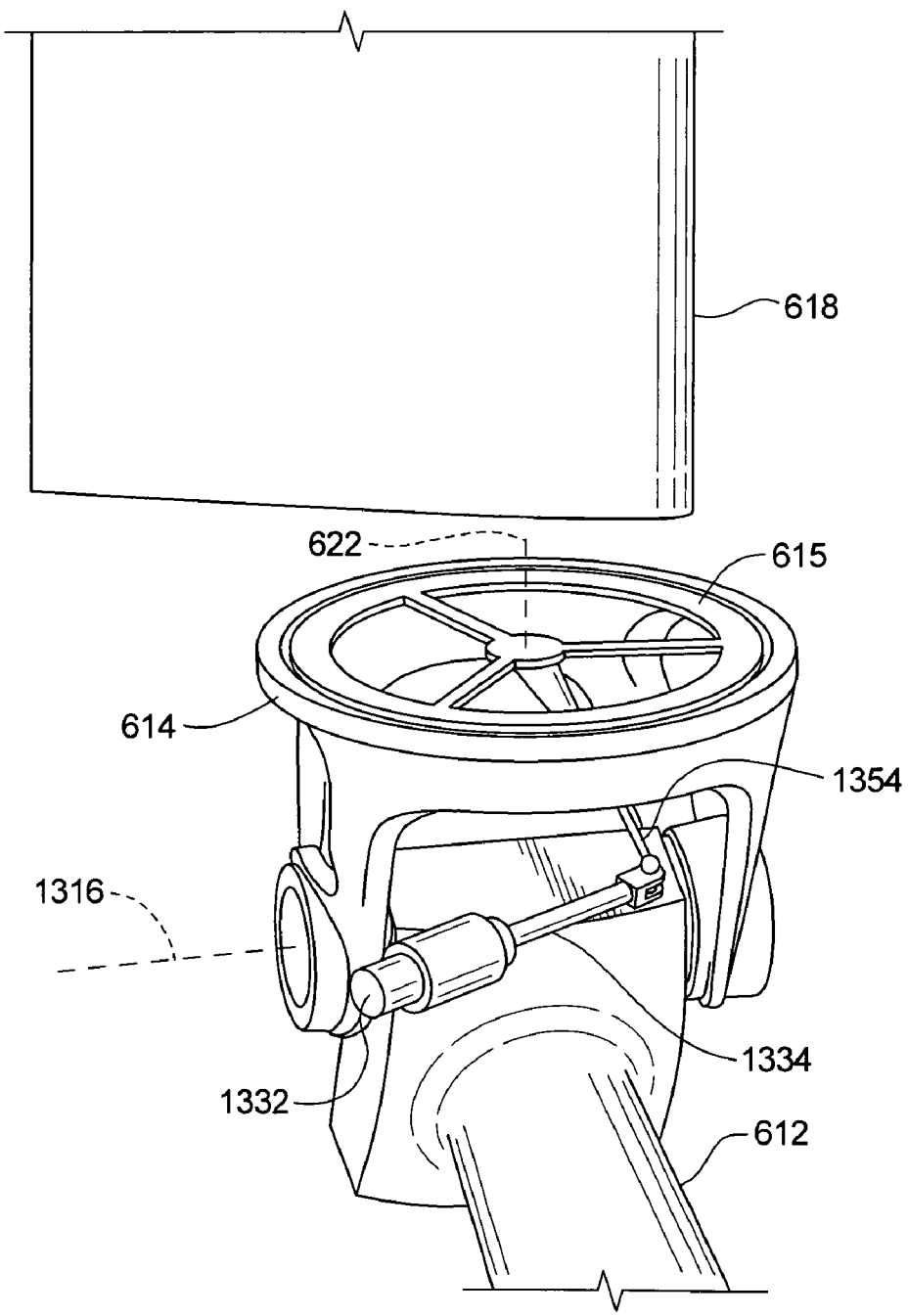
Figure 14C:
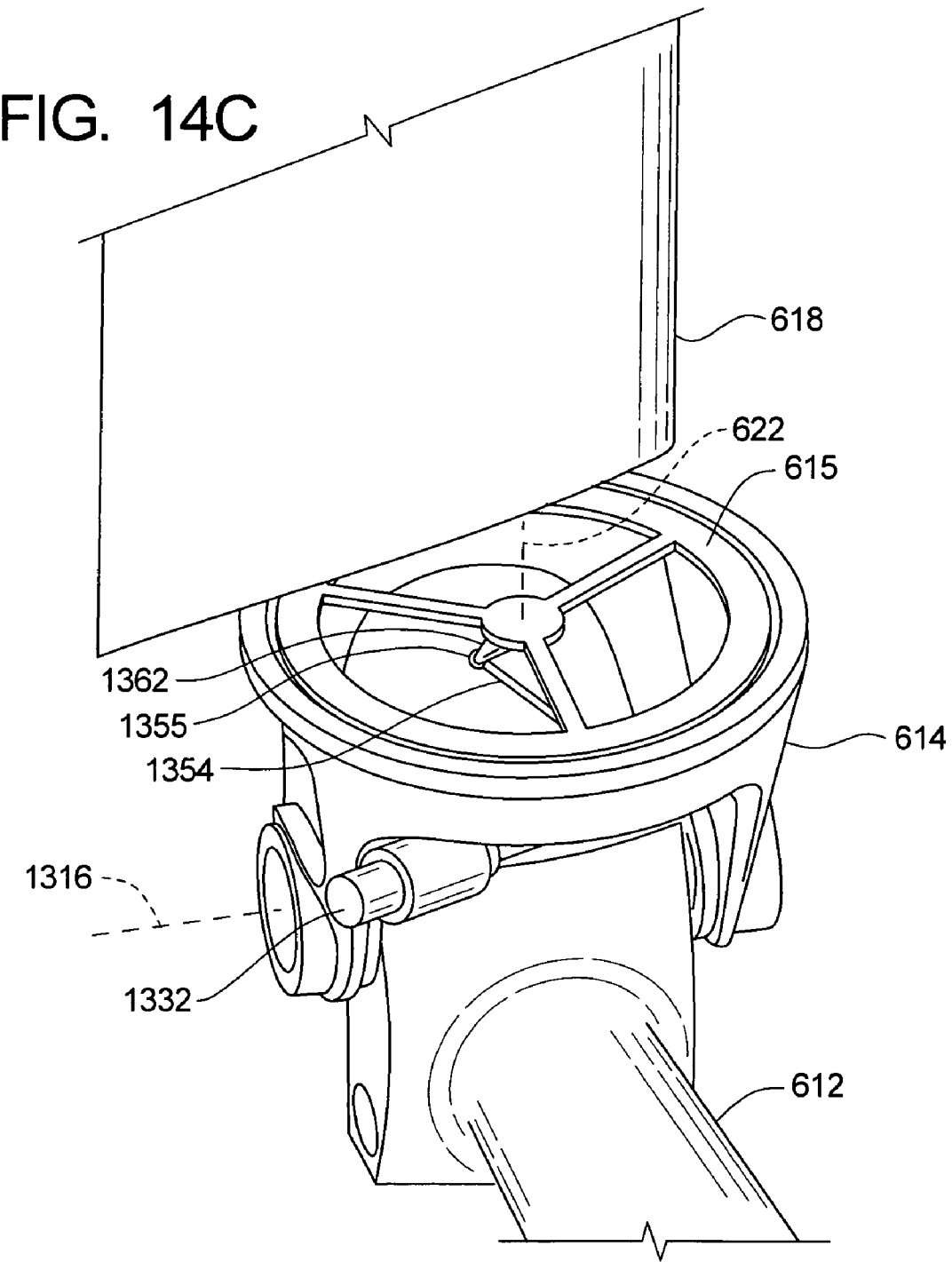

FIGS. 14A-C are perspective views with the pitch actuator fully extended. In this embodiment (as in the embodiment of FIGS. 6A-C through 9A-C) even though the pitch actuator is not moved outward or inward, the pitch changes (in this embodiment, from −14 degrees through 20 degrees, back to −14 degrees), as the flap angle changes from 0 degrees to 22 degrees and to −4 degrees.

The embodiment of FIGS. 13A-C and 14A-C illustrate that there are two or more ways to provide some or all of the advantages and/or features found in the embodiment of FIGS. 6A-C through 9A-C, including, e.g., 1) an ability to achieve a desirably large coupling ratio, especially for low flap angles and/or near cut-out conditions; 2) a desirably large rate of change of coupling ratio (as a function of flap angle); and/or, 3) a link proximal end pivot axis which is movable with respect to the flap axis.

Nevertheless, the embodiment of FIGS. 6A-C through 9A-C is believed to enable or facilitate certain other additional advantages, including, e.g. reducing or avoiding imposition of undesirably high transverse loads, e.g. on the linear (pitch) actuation device, increased flexibility of locating the linear actuation device and improved blade pitch response to linear actuation device motions, especially in the vicinity of minimum pitch position.

In light of the above description, a number of advantages of the present invention can be seen. The present invention provides a desirable flexibility in wind turbine design by avoiding the need to use a constant coupling ratio of changes in pitch angle to changes in flap angle. The present invention can accommodate higher pitch/flap coupling ratios, including values in excess of 2.0 at combinations of minimum flap angle and pitch angle, corresponding to power production in higher wind speeds such as speeds of 20 meters per second or higher.

Preferably, progression in pitch/flap coupling ratio as flap angle diminishes from the normal operating mean is useful in mitigating blade flap excursions, e.g., excursions toward the tower. The present invention can achieve reduction of a blade flap motion and reduction of rotor power and torque fluctuation during operation, including operation in turbulent wind conditions. The present invention improves blade-to-tower clearance conditions during normal operation of the turbine. The present invention can reduce costs by avoiding the weight of tower or other structures otherwise needed to prevent or withstand blade/tower interference (tower strike).

A number of variations and modifications of the present invention can be used. It is possible to use some features of the present invention without using others. For example, it is possible to provide a non-constant coupling ratio without using a mechanical linkage between flap angle and pitch angle. Although it may be possible to derive closed-form equations to predict how some or all of these parameters may affect coupling ratio, in at least some approaches, embodiments of the invention can be designed empirically by constructing physical or numerical models of the invention and changing parameters to achieve operable and/or desired results. Those of skill in the art will understand how to use empirical, modeling and/or predictive methods to design other embodiments of the present invention, at least after understanding the present disclosure. Although embodiments have been described in which a mechanical coupling includes one or more fixed-length components such as a connecting rod, bell crank arms, pitch arms and the like, embodiments can also be provided in which one or more of such components are of adjustable length or in which components are of a controllable length (such as using one or more linear actuators).

The flap axis may be substantially perpendicular to the rotation axis. The proximal end may be pivotable about at least a first pivot axis. Throughout at least a portion of the flap range, the coupling ratio may be non-constant. Throughout at least a portion of the flap range, the coupling ratio may be linear. Throughout at least a portion of the flap range, the coupling ratio may be non-linear. The range of pitch angles may include a feather pitch angle and when the pitch angle of the first blade is within about 0.5 degrees of the feather pitch angle, the coupling ratio is less than about 1 for flap angles less than about 4 degrees. The range of pitch angles may include a feather pitch angle and when the pitch angle of the first blade is within about 0.5 degrees of the feather pitch angle, the coupling ratio is less than about 1.5 for flap angles less than about 4 degrees. The range of pitch angles may include a feather pitch angle and when the pitch angle of the first blade is within about 0.5 degrees of the feather pitch angle, the coupling ratio is less than about 2 for flap angles less than about 4 degrees.

Although a two-blade turbine has been illustrated, at least some aspects of the invention can be used in connection with turbines having one blade or having three or more blades. Although the figures illustrate a downstream turbine, upstream wind turbines can also be used in connection with the present invention. The present invention can be used in connection with a variety of sizes and output capacities of wind turbines. Although the present invention has been described in connection with hydraulic controls and other devices, additional types of controls and devices can be used, including mechanical, electro-mechanical, pneumatic, computer controlled devices, and the like. Although one embodiment uses a hydraulic cylinder for controlling pitch angle of each blade, it is possible to use two or more cylinders per blade, or one cylinder for all blades. It is possible to use some aspects of the invention without using other aspects, e.g. it is possible to provide a non-constant coupling ratio, as described, without providing the ratio as a continuous function of flap angle.

The present invention, in various embodiments, includes components, methods, processes, systems and/or apparatuses substantially as to depicted and described herein, including various embodiments, sub-combinations, and subsets thereof. Those with skill in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

What is claimed is:

1. Apparatus for use in a wind turbine having at least a first blade with a longitudinal axis, wherein said blade rotates about a rotation axis, said first blade being movable with a flap motion about a flap axis which is substantially perpendicular to said rotation axis through a range of flap angles, said first blade being pivotable about said longitudinal axis through a range of pitch angles to provide a pitch motion, the apparatus comprising:

an effective coupling between said flap motion and said pitch motion such that said flap motion is accompanied by a force tending to cause pitch motion, with the ratio of angular degrees of change in flap angle, starting at a given flap angle, to angular degrees of resultant pitch angle change defining a coupling ratio at said given flap angle; and, a link having a distal end and a proximal end, said distal end coupled, at a point non-collinear with said longitudinal axis, such that movement of said distal end provides pitch motion, said proximal end being pivotable about at least a first pivot axis;

said first pivot axis being movable with respect to said flap axis.

2. Apparatus, as claimed in claim 1, wherein said effective coupling includes a mechanical coupling.

3. Apparatus, as claimed in claim 1, wherein said link is a connecting rod and wherein said effective coupling includes said connecting rod;

said connecting rod being coupled to a pitch arm, said pitch arm being rigidly coupled to said blade.

4. Apparatus, as claimed in claim 3, further comprising a controllable actuator which controllably provides movement of said proximal end of said link.

5. Apparatus, as claimed in claim 3, further comprising a bell crank coupled to said proximal end of said link.

6. Apparatus, as claimed in claim 5, wherein said coupling ratio varies as a first function of flap angle when said bell crank is at a first angular rotation about a bell crank rotation axis and wherein said coupling ratio varies as a second function of flap angle, different from said first function, when said bell crank is at a second angular rotation about said bell crank rotation axis, different from said first angular rotation.

7. Apparatus, as claimed in claim 5, further comprising a controllable actuator which controllably rotates said bell crank.

8. Apparatus, as claimed in claim 7, wherein said actuator is a hydraulic actuator.

9. Apparatus, as claimed in claim 1, wherein, throughout at least a portion of said flap range, said coupling ratio is non-constant.

10. Apparatus, as claimed in claim 1, wherein, throughout at least a portion of said flap range, said coupling ratio is linear.

11. Apparatus, as claimed in claim 1, wherein, throughout at least a portion of said flap range, said coupling ratio is non-linear.

12. Apparatus, as claimed in claim 1, wherein said range of pitch angles includes a feather pitch angle and wherein, when the pitch angle of said first blade is within about 0.5 degrees of said feather pitch angle, said coupling ratio is less than about 1 for flap angles less than about 4 degrees.

13. Apparatus, as claimed in claim 1, wherein said range of pitch angles includes a feather pitch angle and wherein, when the pitch angle of said first blade is within about 0.5 degrees of said feather pitch angle, said coupling ratio is less than about 1.5 for flap angles less than about 4 degrees.

14. Apparatus, as claimed in claim 1, wherein said range of pitch angles includes a feather pitch angle and wherein, when the pitch angle of said first blade is within about 0.5 degrees of said feather pitch angle, said coupling ratio is less than about 2 for flap angles less than about 4 degrees.

15. Apparatus, as claimed in claim 1, wherein the change of said coupling ratio over a flap angle range from about −4 degrees to about +4 degrees is greater than about 15 percent.

16. Apparatus, as claimed in claim 1, wherein the change of said coupling ratio over a flap angle range from about −4 degrees to about +4 degrees is greater than about 20 percent.

17. Apparatus, as claimed in claim 1, wherein the change of said coupling ratio over a flap angle range from about −4 degrees to about +4 degrees is greater than about 28 percent.

18. A method for use in a wind turbine having at least a first blade with a longitudinal axis, wherein said blade rotates about a rotation axis, said first blade being movable with a flap motion about a flap axis which is substantially perpendicular to said rotation axis through a range of flap angles, said first blade being pivotable about said longitudinal axis through a range of pitch angles to provide a pitch motion, the method comprising:
  coupling said flap motion and said pitch motion such that said flap motion is accompanied by a force tending to cause pitch motion, with the ratio of angular degrees of change in flap angle, starting at a given flap angle, to angular degrees of resultant change in pitch angle defining a coupling ratio at said given flap angle;
  wherein said range of pitch angles includes a feather pitch angle and wherein, when the pitch angle of said first blade is within about 0.5 degrees of said feather pitch angle, said coupling ratio is less than about 1.5 for flap angles less than about 4 degrees,
  wherein said step of coupling includes providing a mechanical coupling and wherein said mechanical coupling includes a crank arm coupled to a connecting rod, said connecting rod being coupled to a pitch arm, said pitch arm being rigidly coupled to said blade.

19. A method, as claimed in claim 18, further comprising rotating said crank arm using a controllable actuator.

20. A method, as claimed in claim 19, wherein said actuator is a hydraulic actuator.

21. A method for use in a wind turbine having at least a first blade with a longitudinal axis, wherein said blade rotates about a rotation axis, said first blade being movable with a flap motion about a flap axis which is substantially perpendicular to said rotation axis through a range of flap angles, said first blade being pivotable about said longitudinal axis through a range of pitch angles to provide a pitch motion, the method comprising:
  coupling said flap motion and said pitch motion such that said flap motion is accompanied by a force tending to cause pitch motion, with the ratio of angular degrees of change in flap angle, starting at a given flap angle, to angular degrees of resultant change in pitch angle defining a coupling ratio at said given flap angle;
  wherein said range of pitch angles includes a feather pitch angle and wherein, when the pitch angle of said first blade is within about 0.5 degrees of said feather pitch angle, said coupling ratio is less than about 1.5 for flap angles less than about 4 degrees,
  wherein said coupling includes providing a link having a distal end and a proximal end, said distal end coupled, at a point non-collinear with said longitudinal axis, such that movement of said distal end provides pitch motion, said proximal end being pivotable about at least a first pivot axis, said pivot axis being movable with respect to said flap axis.

22. A method for use in a wind turbine having at least a first blade with a longitudinal axis, wherein said blade rotates about a rotation axis, said first blade being movable with a flap motion about a flap axis which is substantially perpendicular to said rotation axis through a range of flap angles, said first blade being pivotable about said longitudinal axis through a range of pitch angles to provide a pitch motion, the method comprising:
  coupling said flap motion and said pitch motion such that said flap motion is accompanied by a force tending to cause pitch motion, with the ratio of angular degrees of change in flap angle, starting at a given flap angle, to angular degrees of resultant change in pitch angle defining a coupling ratio at said given flap angle;
  wherein the change of said coupling ratio over a flap angle range from about −4 degrees to about +4 degrees is greater than about 15 percent,
  wherein said step of coupling includes providing a mechanical coupling and wherein said mechanical coupling includes a crank arm coupled to a connecting rod, said connecting rod being coupled to a pitch arm, said pitch arm being rigidly coupled to said blade.

23. A method, as claimed in claim 22, further comprising rotating said crank arm using a controllable actuator.

24. A method for use in a wind turbine having at least a first blade with a longitudinal axis, wherein said blade rotates about a rotation axis, said first blade being movable with a flap motion about a flap axis which is substantially perpendicular to said rotation axis through a range of flap angles, said first blade being pivotable about said longitudinal axis through a range of pitch angles to provide a pitch motion, the method comprising:

coupling said flap motion and said pitch motion such that said flap motion is accompanied by a force tending to cause pitch motion, with the ratio of angular degrees of change in flap angle, starting at a given flap angle, to angular degrees of resultant change in pitch angle defining a coupling ratio at said given flap angle;

wherein the change of said coupling ratio over a flap angle range from about −4 degrees to about +4 degrees is greater than about 15 percent, wherein said coupling includes providing a link having a distal end and a proximal end, said distal end coupled, at a point non-collinear with said longitudinal axis, such that movement of said distal end provides pitch motion, said proximal end being pivotable about at least a first pivot axis, said pivot axis being movable with respect to said flap axis.

25. Apparatus for use in a wind turbine having at least a first blade with a longitudinal axis, wherein said blade rotates about a rotation axis, said first blade being movable with a flap motion about a flap axis which is substantially perpendicular to said rotation axis through a range of flap angles, said first blade being pivotable about said longitudinal axis through a range of pitch angles to provide a pitch motion, the apparatus comprising:

means for coupling said flap motion and said pitch motion such that said flap motion is accompanied by a force tending to cause pitch motion, with the ratio of angular degrees of change in flap angle, starting at a given flap angle, to angular degrees of resultant change in pitch angle defining a coupling ratio at said given flap angle;

link means having a distal end and a proximal end, said distal end coupled at a point non-collinear with said longitudinal axis such that movement of said distal end provides pitch motion, said proximal end being pivotable about at least a first pivot axis; and, means for moving said pivot axis with respect to said flap axis.

26. Apparatus, as claimed in claim 25, wherein said means for coupling includes a mechanical coupling means.

27. Apparatus, as claimed in claim 25, wherein said link means includes a connecting rod; and, means for coupling said connecting rod to a pitch arm means, said pitch arm means being rigidly coupled to said blade.

28. Apparatus, as claimed in claim 25, wherein said means for coupling includes a crank arm means; and, means for coupling said crank arm means to said blade.

29. Apparatus, as claimed in claim 25, wherein said means for coupling further comprises a controllable actuator means which controllably moves said first pivot axis.

30. Apparatus, as claimed in claim 29, wherein said actuator means comprises a hydraulic actuator.

31. Apparatus, as claimed in claim 25, further comprising a bell crank means coupled to said proximal end of said link means.

32. Apparatus, as claimed in claim 31, wherein said means for coupling further comprises a controllable actuator means which controllably moves said bell crank means.

33. Apparatus, as claimed in claim 25, wherein, throughout at least a portion of said flap range, said coupling ratio is non-constant.

34. Apparatus, as claimed in claim 25, wherein, throughout at least a portion of said flap range, said coupling ratio is linear.

35. Apparatus, as claimed in claim 25, wherein, throughout at least a portion of said flap range, said coupling ratio is non-linear.

36. Apparatus, as claimed in claim 25, wherein said range of pitch angles includes a feather pitch angle and wherein, when the pitch angle of said first blade is within about 0.5 degrees of said feather pitch angle, said coupling ratio is less than about 1 for flap angles less than about 4 degrees.

37. Apparatus, as claimed in claim 25, wherein said range of pitch angles includes a feather pitch angle and wherein, when the pitch angle of said first blade is within about 0.5 degrees of said feather pitch angle, said coupling ratio is less than about 1.5 for flap angles less than about 4 degrees.

38. Apparatus, as claimed in claim 25, wherein said range of pitch angles includes a feather pitch angle and wherein, when the pitch angle of said first blade is within about 0.5 degrees of said feather pitch angle, said coupling ratio is less than about 2 for flap angles less than about 4 degrees.

39. Apparatus, as claimed in claim 25, wherein the change of said coupling ratio over a flap angle range from about −4 degrees to about +4 degrees is greater than about 15 percent.

40. Apparatus, as claimed in claim 25, wherein the change of said coupling ratio over a flap angle range from about −4 degrees to about +4 degrees is greater than about 20 percent.

41. Apparatus, as claimed in claim 25, wherein the change of said coupling ratio over a flap angle range from about −4 degrees to about +4 degrees is greater than about 28 percent.

* * * * *